United States Patent
Kim et al.

(10) Patent No.: US 11,696,230 B2
(45) Date of Patent: Jul. 4, 2023

(54) METHOD AND APPARATUS FOR REDUCING POWER CONSUMPTION OF TERMINAL IN WIRELESS COMMUNICATION SYSTEM

(71) Applicant: Samsung Electronics Co., Ltd., Suwon-si (KR)

(72) Inventors: Taehyoung Kim, Suwon-si (KR); Hoondong Noh, Suwon-si (KR); Jeongho Yeo, Suwon-si (KR); Jinkyu Kang, Suwon-si (KR); Youngbum Kim, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 16/788,858

(22) Filed: Feb. 12, 2020

(65) Prior Publication Data
US 2020/0267648 A1    Aug. 20, 2020

(30) Foreign Application Priority Data
Feb. 14, 2019    (KR) .................... 10-2019-0017249

(51) Int. Cl.
*H04W 52/02*   (2009.01)
*H04L 5/00*    (2006.01)
*H04W 72/23*   (2023.01)

(52) U.S. Cl.
CPC ....... *H04W 52/0225* (2013.01); *H04L 5/0048* (2013.01); *H04W 72/23* (2023.01)

(58) Field of Classification Search
CPC ............ H04W 52/0225; H04W 72/042; H04L 5/0048
See application file for complete search history.

(56) References Cited

U.S. PATENT DOCUMENTS

| 2017/0055242 | A1  | 2/2017 | Kusashima et al. |
| 2018/0097598 | A1* | 4/2018 | Ang ...................... H04L 5/0078 |
| 2021/0266835 | A1* | 8/2021 | Kaikkonen ....... H04W 52/0225 |

FOREIGN PATENT DOCUMENTS

| KR | 10-2019-0120665 A | 10/2019 |
| WO | 2015-176296 A1    | 11/2015 |

(Continued)

OTHER PUBLICATIONS

3GPP TSG RAN WG1 Ad-Hoc Meeting 1901,R1-1900421 Taipei, Jan. 21-25, 2019 Source: CMCC Title:Discussion on UE power saving schemes with adaption to UE traffic Agenda item:7.2.9.2.1; Document for: Discussion & Decision (Year: 2019).*

(Continued)

*Primary Examiner* — Abdeltif Ajid
(74) *Attorney, Agent, or Firm* — Jefferson IP Law, LLP

(57) ABSTRACT

A communication method and system for converging a 5th-Generation (5G) communication system for supporting higher data rates beyond a 4th-Generation (4G) system with a technology for Internet of Things (IoT) is provided. The disclosure may be applied to intelligent services based on the 5G communication technology and the IoT-related technology, such as smart home, smart building, smart city, smart car, connected car, health care, digital education, smart retail, security and safety services. The disclosure provides a method and an apparatus for reducing power consumption of the terminal.

12 Claims, 11 Drawing Sheets

(56) References Cited

FOREIGN PATENT DOCUMENTS

WO         2017/075791 A1     5/2017
WO    WO-2020155166 A1 *   8/2020    ........ H04W 52/0235

OTHER PUBLICATIONS

International Search Report dated May 20, 2020, issued in an International Application No. PCT/KR2020/001944.
CMCC: 'Discussion on UE power saving schemes with adaption to UE traffic', R1-1900421, 3GPP TSG RAN WG1 Ad-Hoc Meeting 1901, Sections 2.1-2.2; and figure 2; Jan. 12, 2019, Taipei.
LG Electronics: 'Numerical results for UE power saving schemes', R1-1900598, 3GPP TSG RAN WG1 Ad-Hoc Meeting 1901, Section 2.1; Jan. 11, 2019, Taipei, Taiwan.
Huawei et al.: 'Signaling based mechanisms for UE power saving', R1-1810155, 3GPP TSG RAN WG1 Meeting #94bis, Section 2; Nov. 29, 2018, Chengdu, China.
European Search Report dated Dec. 23, 2021, issued in European Application No. 20755955.0.

* cited by examiner

METHOD AND APPARATUS FOR REDUCING POWER CONSUMPTION OF TERMINAL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0017249, filed on Feb. 14, 2019, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for reducing power consumption of a terminal.

2. Description of Related Art

To meet the demand for wireless data traffic having increased since deployment of 4th Generation (4G) communication systems, efforts have been made to develop an improved $5^{th}$ Generation (5G) or pre-5G communication system. Therefore, the 5G or pre-5G communication system is also called a 'Beyond 4G Network' or a 'Post Long Term Evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency-shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies, such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As described above, as a wireless communication system has advanced to provide various services, a method for smoothly providing the services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for effectively reducing power consumption of a terminal in a wireless communication system.

Additional aspects will be set forth in part in the description which follows and, in part, will be apparent from the description, or may be learned by practice of the presented embodiments.

In accordance with an aspect of the disclosure, a method performed by a terminal is provided. The method includes receiving a parameter relating to a reference signal for a preparation operation from a base station, by using the reference signal received based on the parameter, performing the preparation operation for monitoring a physical downlink control channel (PDCCH) in a discontinuous reception (DRX) active time, and based on a result of the preparation operation, monitoring the PDCCH, wherein the reference signal is received in case that a DRX cycle configured for the terminal is larger than or equal to a threshold value.

In accordance with another aspect of the disclosure, a method performed by a base station is provided. The method includes transmitting a parameter relating to a reference signal for a preparation operation to a terminal, and transmitting the reference signal to the terminal, based on the parameter, wherein the terminal performs the preparation operation using the reference signal, to monitor a PDCCH in a DRX active time, wherein the terminal monitors the PDCCH, based on a result of the preparation operation, and wherein the reference signal is transmitted in case that a DRX cycle configured for the terminal is larger than or equal to a threshold value.

In accordance with another aspect of the disclosure, a terminal is provided. The terminal includes a transceiver configured to transmit and receive a signal, and a controller configured to receive a parameter relating to a reference signal for a preparation operation from a base station, perform the preparation operation for monitoring a PDCCH in a DRX active time by using the reference signal received based on the parameter, and monitor the PDCCH, based on a result of the preparation operation, wherein the reference signal is received in case that a DRX cycle configured for the terminal is larger than or equal to a threshold value.

In accordance with another aspect of the disclosure, a base station is provided. The base station includes a transceiver configured to transmit and receive a signal, and a controller configured to transmit a parameter relating to a reference signal for a preparation operation to the terminal and transmit the reference signal to the terminal, based on the parameter, wherein the terminal performs the preparation operation using the reference signal, to monitor a PDCCH in a DRX active time, wherein the terminal monitors the PDCCH, based on a result of the preparation operation, and wherein the reference signal is transmitted in case that a DRX cycle configured for the terminal is larger than or equal to a threshold value.

According to an embodiment proposed in the disclosure, power consumption of a terminal can be effectively reduced through a method of transmission or reception between the terminal and a base station.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
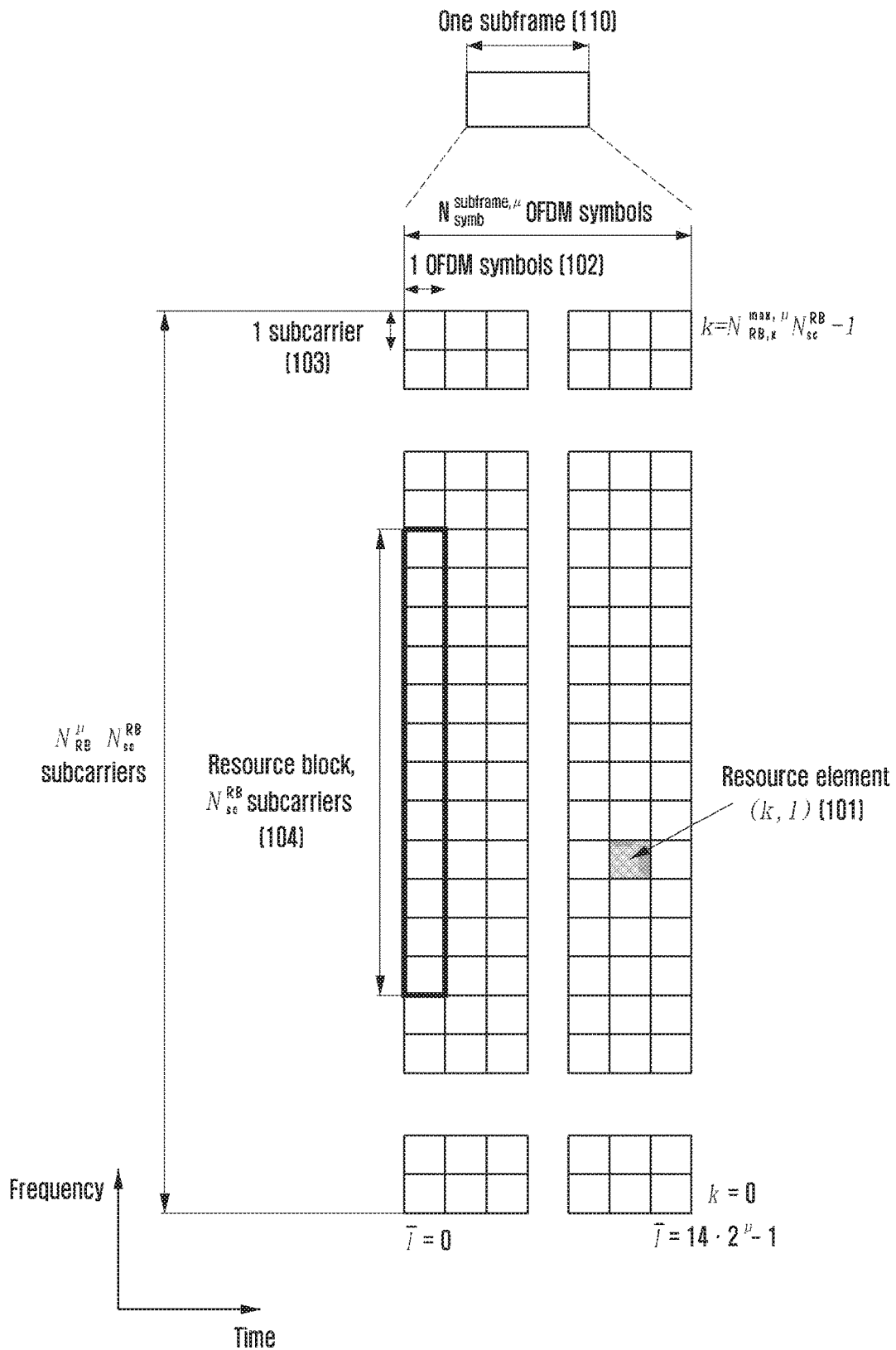
FIG. 1 illustrates a basic structure of a time-frequency domain in a 5G communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments in the specification, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly convey the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the following embodiments and may be implemented in various different forms, and the embodiments are provided to make the disclosure comprehensive and completely inform those skilled in the art of the scope of the disclosure and the disclosure is only defined by the scope of the claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions that are executed on the computer or other programmable data processing apparatus provide steps for implementing the functions specified in the flowchart block or blocks.

In addition, each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

As used herein, the unit refers to a software element or a hardware element, such as a field programmable gate array (FPGA) or an application specific integrated circuit (ASIC), which performs a predetermined function. However, the unit does not always have a meaning limited to software or hardware. The unit may be constructed either to be stored in an addressable storage medium or to execute one or more processors. Therefore, the unit includes, for example, elements, such as software elements, object-oriented software elements, class elements and task elements, processes, functions, properties, procedures, sub-routines, segments of a program code, drivers, firmware, micro-codes, circuits, data, database, data structures, tables, arrays, and parameters. Functions provided by the elements and units may be either combined into a smaller number of elements and units or divided into a larger number of additional elements and units. Moreover, the elements and units may be implemented to reproduce one or more computer program unit (CPU)s within a device or a security multimedia card.

A wireless communication system has developed to be a broadband wireless communication system that provides a high speed and high quality packet data service, like the communication standards, for example, high speed packet access (HSPA), long term evolution (LTE or evolved universal terrestrial radio access (E-UTRA)), LTE-advanced (LTE-A), and LTE-Pro of 3GPP, high rate packet data (HRPD), and ultra mobile broadband (UMB) of 3GPP2, 802.16e of Institute of Electrical and Electronics Engineers (IEEE), and the like, beyond the voice-based service provided at the initial stage.

An LTE system, which is a representative example of the broadband wireless communication system, employs an orthogonal frequency division multiplexing (OFDM) scheme for a downlink (DL), and employs a single carrier frequency division multiple access (SC-FDMA) scheme for an uplink (UL). Uplink denotes a wireless link for transmitting data or a control signal by a terminal (user equipment (UE) or mobile station (MS)) to a base station (eNode B or base station (BS)), and downlink denotes a wireless link for transmitting data or a control signal by a base station to a terminal. In the multiple access schemes described above, time-frequency resources for carrying data or control information are allocated and managed in a manner to prevent overlapping of the resources between users, i.e., to establish the orthogonality, so as to identify data or control information of each user.

A future communication system after LTE, that is, a 5G communication system, is required to freely apply various requirements from a user, a service provider, and the like, and thus support a service satisfying all the various requirements. Services considered for 5G communication systems may include enhanced mobile broadband (eMBB), massive machine type communication (mMTC), ultra-reliability low-latency communication (URLLC), etc.

The purpose of enhanced mobile broadband (eMBB) is to provide a data rate enhanced more than a data rate supported by the existing LTE, LTE-A, or LTE-Pro. For example, in a 5G communication system, eMBB is required to provide a peak data rate of 10 Gbps for uplink and a peak data rate of 20 Gbps for downlink in view of a single base station. In addition, the 5G communication system is required to provide the peak data rates and an increased user perceived data rate of a terminal. In order to satisfy the requirements described above, a 5G communication system requires the improvement of various transmission/reception technologies including further enhanced multi input multi output (MIMO) transmission technology. In addition, while current LTE uses, for the transmission of a signal, a maximum transmission bandwidth of 20 MHz in a band of 2 GHz used by the LTE, a 5G communication system uses a frequency bandwidth greater than 20 MHz in a frequency band of 3-6 GHz or a frequency band of 6 GHz or greater to satisfy a data rate required for the 5G communication system.

Meanwhile, in a 5G communication system, mMTC has been considered to support application services, such as the Internet of Things (IoT). mMTC requires the support of massive terminal connection in a cell, the improvement of terminal coverage, improved battery life time, terminal cost reduction, etc. in order to efficiently provide the Internet of Things. Since the Internet of Things is mounted in various sensors and devices to provide communication functions, mMTC is required to support a large number of terminals (e.g., 1,000,000 terminals/km$^2$) in a cell. In addition, a terminal supporting mMTC requires a wider coverage compared to other services provided in a 5G communication system because the terminal is highly probable, due to the nature of mMTC, to be disposed in a radio shadow area, such as the basement of a building, which a cell fails to cover. A terminal supporting mMTC is required to be inexpensive and have a very long battery life time, like 10-15 years, because it is hard to often change the battery of the terminal.

Lastly, URLLC is a cellular-based wireless communication service which is used for a particular purpose (mission-critical). For example, services used in remote control for robot or machinery, industrial automation, unmanned aerial vehicle, remote health care, emergency alert, etc. may be considered for URLLC. Therefore, communication provided by URLLC is required to provide very low latency and very high reliability. For example, a service supporting URLLC is required to satisfy a wireless connection latency time (air interface latency) smaller than 0.5 milliseconds and a packet error rate of 10-5 or smaller at the same time. Therefore, for services supporting URLLC, a 5G system requires a design for providing a transmission time interval (TTI) shorter than those of other services and allocating a wide domain of resources in a frequency band to secure the reliability of a communication link.

Three services of 5G technology, that is, eMBB, URLLC, and mMTC may be multiplexed and then transmitted in a single system. In order to satisfy different requirements of the services, different transmission/reception schemes and different transmission/reception parameters may be used for the services, respectively.

Hereinafter, a frame structure of a 5G system will be described below with reference to the drawings.

FIG. 1 illustrates a basic structure of a time-frequency domain which is a wireless resource region in which data or a control channel is transmitted, in a 5G system according to an embodiment of the disclosure.

Referring to FIG. 1, the transverse axis indicates a time domain, and the longitudinal axis indicates a frequency domain. In the time-frequency domain, a basic unit of a resource may be defined as a resource element (RE) 101, that is, one orthogonal frequency division multiplexing (OFDM) symbol 102 in a time axis and one subcarrier 103 in a frequency axis. In the frequency domain, $N_{sc}^{RR}$ number (e.g., 12) of consecutive REs may configure a single resource block (RB) 104. A subframe 110 is a time interval of 1 ms, and a plurality of OFDM symbols may configure a single subframe 110.

Figure 2:
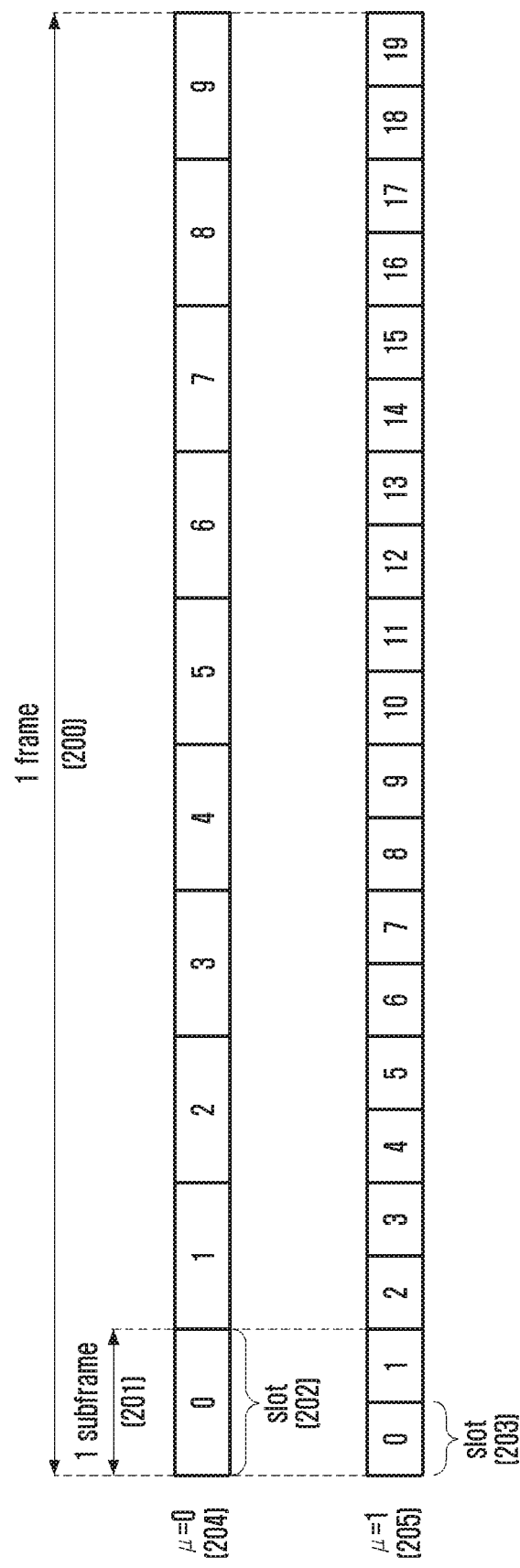
FIG. 2 illustrates a structure of a frame, a subframe, and a slot in a 5G communication system according to an embodiment of the disclosure.

FIG. 2 illustrates a slot structure considered for a 5G system according to an embodiment of the disclosure.

Referring to FIG. 2 a structure of a frame 200, a subframe 201, and a slot 202 is illustrated. One frame 200 may be defined as 10 ms. One subframe 201 may be defined as 1 ms, and thus one frame 200 may be configured by a total of 10 subframes 201. One slot 202 or 203 may be defined as 14 OFDM symbols (i.e., the slot number ($N_{symb}^{slot}$) of symbols per one slot=14). One subframe 201 may be configured by one slot 202 or a plurality of slots 203, and the number of slots 202 or 203 per one subframe 201 may be different according to a configuration value μ 204 or 205 of a subcarrier spacing (SCS). FIG. 2 illustrates an example in which a subcarrier spacing configuration value μ is 0 (the case indicated by reference numeral 204), and a subcarrier spacing configuration value μ is 1 (the case indicated by reference numeral 205). If μ is 0 (204), one subframe 201 may be configured by one slot 202, and if μ is 1 (205), one subframe 201 may be configured by two slots 203. For example, the number ($N_{slot}^{subframe,\mu}$) of slots per one subframe may be different according to a configuration value μ of a subcarrier spacing, and according thereto, the number ($N_{slot}^{frame,\mu}$) of slots per one frame may be different. $N_{slot}^{subframe,\mu}$ and $N_{slot}^{frame,\mu}$ according to each subcarrier spacing configuration μ may be defined as shown in table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, downlink control information (DCI) in a 5G system will be described below.

In a 5G system, scheduling information on uplink data (or physical uplink data channel (physical uplink shared channel, PUSCH)) or downlink data (or physical downlink data channel (physical downlink shared channel, PDSCH)) is transferred through DCI from a base station to a terminal.

The terminal may monitor a fallback DCI format and a non-fallback DCI format for a PUSCH or a PDSCH. The fallback DCI format may be configured by a fixed field pre-defined between a base station and a terminal, and the non-fallback DCI format may include a configurable field.

The DCI may undergo a channel coding and modulation process, and then be transmitted through a physical downlink control channel (PDCCH) from the base station and the terminal. A cyclic redundancy check (CRC) is attached to a DCI message payload, and the CRC is scrambled by a radio network temporary identifier (RNTI) corresponding to the identity of the terminal. Different types of RNTIs are used according to the purpose of a DCI message, for example, UE-specific data transmission, a power control command, a random access response, or the like. For example, a RNTI is not explicitly transmitted, and is transmitted after being included in a CRC calculation process. The terminal having received a DCI message transmitted on a PDCCH may identify a CRC by using an assigned RNTI, and if a CRC identification result is correct, the terminal may identify that the message has been transmitted to the terminal.

For example, DCI scheduling a PDSCH for system information (SI) may be scrambled by a SI-RNTI. DCI scheduling a PDSCH for a random access response (RAR) message may be scrambled by a RA-RNTI. DCI scheduling a PDSCH for a paging message may be scrambled by a P-RNTI. DCI notifying of a slot format indicator (SFI) may be scrambled by a SFI-RNTI. DCI notifying of a transmit power control (TPC) may be scrambled by a TPC-RNTI. DCI scheduling a UE-specific PDSCH or PUSCH may be scrambled by a cell RNTI (C-RNTI).

DCI format 0_0 may be used for fallback DCI scheduling a PUSCH, and in this case, a CRC may be scrambled by a C-RNTI. DCI format 0_0 having a CRC scrambled by a C-RNTI may include, for example, pieces of information below.

TABLE 2

Identifier for DCI formats - [1] bit
Frequency domain resource assignment - $[\lceil \log_2(N_{RB}^{UL,BWP}(N_{RB}^{UL,BWP} + 1)/2) \rceil]$ bits
Time domain resource assignment - X bits
Frequency hopping flag - 1 bit.
Modulation and coding scheme - 5 bits
New data indicator - 1 bit
Redundancy version - 2 bits
hybrid automatic repeat request (HARQ) process number - 4 bits
TPC command for scheduled PUSCH (wherein TPC indicates transmit power control) - [2] bits
UL/SUL indicator (uplink/supplementary uplink indicator) - 0 or 1 bit DCI format 0_1 may be used for non-fallback DCI scheduling a PUSCH, and in this case, a CRC may be scrambled by a C-RNTI. DCI format 0_1 having a CRC scrambled by a C-RNTI may include, for example, pieces of information below.

TABLE 3

- Carrier indicator - 0 or 3 bits
- UL/SUL indicator - 0 or 1 bit
- Identifier for DCI formats - [1] bits
- Bandwidth part indicator - 0, 1 or 2 bits
- Frequency domain resource assignment
* For resource allocation type 0, $\lceil N_{RB}^{UL,BWP}/P \rceil$ bits
* For resource allocation type 1, $\lceil \log_2(N_{RB}^{UL,BWP}(N_{RB}^{UL,BWP}+1)/2 \rceil$ bits
- Time domain resource assignment -1, 2, 3, or 4 bits
- VRB-to-PRB mapping (mapping between virtual resource block and physical resource block) - 0 or 1 bit, only for resource allocation type 1.

TABLE 3-continued

* 0 bit if only resource allocation type 0 is configured;
* 1 bit otherwise.
- Frequency hopping flag - 0 or 1 bit, only for resource allocation type 1.
* 0 bit if only resource allocation type 0 is configured;
* 1 bit otherwise.
- Modulation and coding scheme - 5 bits
- New data indicator - 1 bit
- Redundancy version - 2 bits
- HARQ process number - 4 bits
- 1st downlink assignment index - 1 or 2 bits
* 1 bit for semi-static HARQ-acknowledgement (HARQ-ACK) codebook;
* 2 bits for dynamic HARQ-ACK codebook with single HARQ-ACK codebook.
- 2nd downlink assignment index - 0 or 2 bits
* 2 bits for dynamic HARQ-ACK codebook with two HARQ-ACK sub-codebooks;
* 0 bit otherwise.
- TPC command for scheduled PUSCH - 2 bits

- SRS resource indicator - $\left\lceil \log_2\left(\sum_{k=1}^{L_{max}} \binom{N_{SRS}}{k}\right) \right\rceil$ or $\lceil \log_2(N_{SRS}) \rceil$ bits

* $\left\lceil \log_2\left(\sum_{k=1}^{L_{max}} \binom{N_{SRS}}{k}\right) \right\rceil$ bits for non-codebook based PUSCH transmission(if PUSCH transmission is not based on codebook);
* $\lceil \log_2(N_{SRS}) \rceil$ bits for codebook based PUSCH transmission(if PUSCH transmission is based on codebook).
- Precoding information and number of layers -up to 6 bits
- Antenna ports - up to 5 bits
- SRS request - 2 bits
- CSI request (wherein CSI indicates channel state information) - 0, 1, 2, 3, 4, 5, or 6 bits
- CBG transmission information (wherein CBG indicates code block group)- 0, 2, 4, 6, or 8 bits
- PTRS-DMRS association (wherein PTRS indicates phase tracking reference signal and DMRS indicates demodulation reference signal)- 0 or 2 bits.
- beta_offset indicator - 0 or 2 bits
- DMRS sequence initialization (wherein DMRS indicates demodulation reference signal)- 0 or 1 bit DCI format 1_0 may be used for fallback DCI scheduling a PDSCH, and in this case, a CRC may be scrambled by a C-RNTI. DCI format 1_0 having a CRC scrambled by a C-RNTI may include, for example, pieces of information below.

TABLE 4

Identifier for DCI formats - [1] bit
Frequency domain resource assignment -
$[\lceil \log_2(N_{RB}^{DL,BWP}(N_{RB}^{DL,BWP} + 1)/2) \rceil]$ bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator (wherein PUCCH indicates physical uplink control channel) - 3 bits
PDSCH-to-HARQ feedback timing indicator - [3] bits DCI format 1_1 may be used for non-fallback DCI scheduling a PDSCH, and in this case, a CRC may be scrambled by a C-RNTI. DCI format 1_1 having a CRC scrambled by a C-RNTI may include, for example, pieces of information below.

TABLE 5

Carrier indicator - 0 or 3 bits
Identifier for DCI formats - [1] bits
Bandwidth part indicator - 0, 1 or 2 bits
Frequency domain resource assignment
For resource allocation type 0, $\lceil N_{RB}^{DL,BWP}/P \rceil$ bits
For resource allocation type 1,
$\lceil \log_2(N_{RB}^{DL,BWP}(N_{RB}^{DL,BWP} + 1)/2) \rceil$ bits
Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator (wherein PRB indicates physical resource block) - 0 or 1 bit
Rate matching indicator - 0, 1, or 2 bits
ZP CSI-RS trigger (wherein ZP CSI-RS indicates zero power channel state information-reference signal) - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits
CBG flushing out information (wherein CBG indicates code block group) - 0 or 1 bit
DMRS sequence initialization - 1 bit Hereinafter, a method for configuring a bandwidth part (BWP) considered for a 5G communication system will be described.

Figure 3:
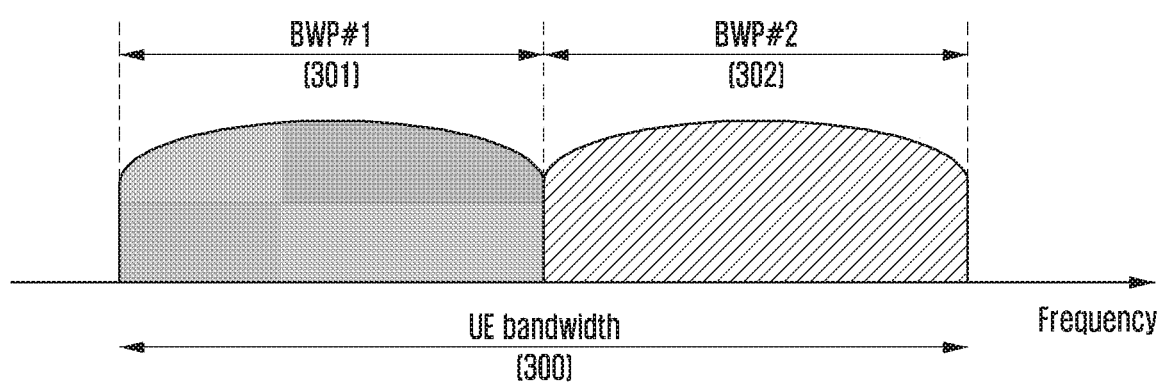
FIG. 3 illustrates a configuration of a bandwidth part in a 5G communication system according to an embodiment of the disclosure.

FIG. 3 illustrates a configuration of a bandwidth part in a 5G communication system according to an embodiment of the disclosure.

Referring to FIG. 3, a terminal bandwidth 300 configured to be divided into two bandwidth parts, that is, bandwidth part #1 301 and bandwidth part #2 302 is illustrated. A base station may configure one bandwidth part or a plurality of bandwidth parts for a terminal and may configure pieces of information below for each bandwidth part.

TABLE 6

| | |
|---|---|
| BWP ::= | SEQUENCE { |
| bwp-Id | BWP-Id, |
| (bandwidth part identifier) | |
| locationAndBandwidth | INTEGER (1..65536), |
| (bandwidth part location) | |
| subcarrierSpacing | ENUMERATED {n0, n1, n2, n3, n4, n5}, |
| (subcarrier spacing) | |
| cyclicPrefix | ENUMERATED { extended } |
| (cyclic prefix) | |
| } | |

In addition to pieces of configuration information described above, various parameters related to a bandwidth part may be configured for the terminal. The pieces of information may be transferred by the base station to the terminal through higher layer signaling, for example, radio resource control (RRC) signaling. At least one bandwidth part among the configured one bandwidth part or plurality of bandwidth parts may be activated. Whether the configured bandwidth part is activated may be dynamically transferred through a medium access control (MAC) control element (MAC CE) or DCI, or semi-statically transferred through RRC signaling by the base station to the terminal.

The bandwidth part configuration supported by 5G technology may be used for various purposes.

For example, if a bandwidth supported by the terminal is smaller than a system bandwidth, smooth operation of the terminal may be supported through a bandwidth part configuration. For example, the base station may configure, for the terminal, the frequency location (configuration information 2) of a bandwidth part shown in table 6 above so that the terminal transmits or receives data at a particular frequency location in a system bandwidth.

For another example, the base station may configure a plurality of bandwidth parts for a terminal in order to support different numerologies. For example, in order to support, to a terminal, both data transmission/reception using a subcarrier spacing of 15 KHz and data transmission/reception using a subcarrier spacing of 30 KHz, the base station may configure, for the terminal, two bandwidth parts having a subcarrier spacing of 15 KHz and a subcarrier spacing of 30 KHz, respectively. Different bandwidth parts may undergo frequency division multiplexing (FDM), and if the terminal and the base station are to transmit or receive data using a particular subcarrier spacing, a bandwidth part configured to have the subcarrier spacing may be activated.

For another example, the base station may configure bandwidth parts having different bandwidths for the terminal in order to reduce the power consumption of the terminal. For example, if the terminal supports a very wide bandwidth, for example, a bandwidth of 100 MHz, and always transmits or receives data through the bandwidth, the terminal may consume a very large quantity of power. More particularly, unnecessary monitoring of a downlink control channel in a large bandwidth of 100 MHz under no traffic is very inefficient in view of power consumption. In order to reduce the power consumption of a terminal, the base station may configure a bandwidth part having a relatively small bandwidth, for example, a bandwidth part having 20 MHz for the terminal. If there is no traffic, the terminal may monitor a 20 MHz bandwidth part, and if data is generated, the terminal may transmit or receive the data through a 100 MHz bandwidth part according to an indication of the base station.

In relation to a method for configuring a bandwidth part described above, terminals before RRC-connected may receive configuration information of an initial bandwidth part through a master information block (MIB) in an initial access stage. More specifically, a control resource set (CORESET) for a downlink control channel through which DCI scheduling a system information block (SIB) can be transmitted may be configured for the terminal through an master information block (MIB) of a physical broadcast channel (PBCH). The bandwidth of the control resource set configured by the MIB may be considered as an initial bandwidth part, and the terminal may receive a PDSCH through which the SIB is transmitted, through the configured initial bandwidth part. An initial bandwidth part may be used for other system information (OSI), paging, and random access in addition to the reception of a SIB.

Hereinafter, a downlink control channel of a 5G communication system will be described below with reference to the drawings.

Figure 4:
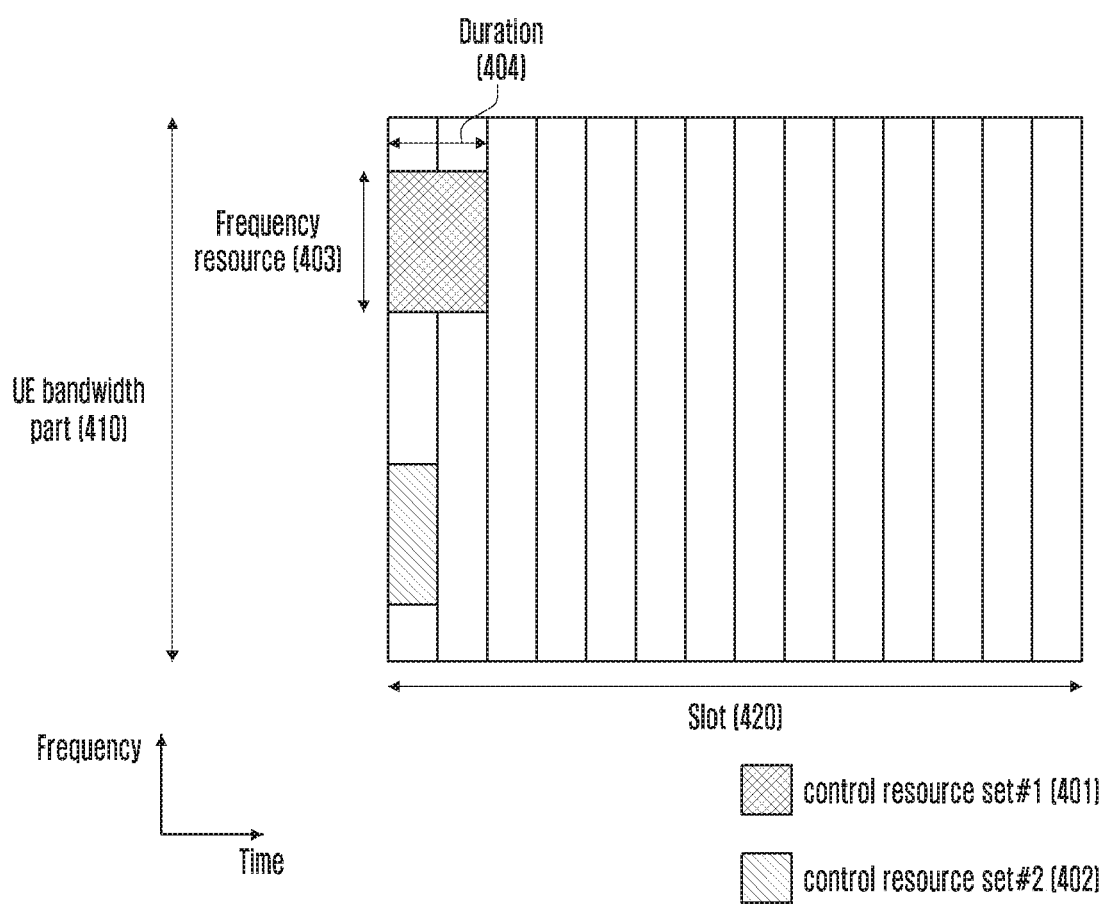
FIG. 4 illustrates a configuration of a control resource set of a downlink control channel in a 5G communication system according to an embodiment of the disclosure.

FIG. 4 illustrates a control resource set (CORESET) on which a downlink control channel is transmitted, in a 5G wireless communication system according to an embodiment of the disclosure.

Referring to FIG. 4, a bandwidth part 410 of a terminal configured along a frequency axis and two control resource sets (control resource set #1 401 and control resource set #2 402) are configured in one slot 420 along a time axis is illustrated. The control resource sets 401 and 402 may be configured on a particular frequency resource 403 in the entire terminal bandwidth part 410 along the frequency axis. The control resource sets 401 and 402 may be configured by one OFDM symbol or a plurality of OFDM symbols may be configured along the time axis, and the configured OFDM symbol or symbols may be defined as a control resource set duration 404. In the example illustrated in FIG. 4, control resource set #1 401 is configured to have a control resource set duration of two symbols, and control resource set #2 402 is configured to have a control resource set duration of one symbol.

A control resource set in 5G technology, described above may be configured for a terminal by a base station through higher layer signaling (e.g., system information, master information block (MIB), and radio resource control (RRC) signaling). Configuring a control resource set for a terminal means that a base station provides, to a terminal, information, such as a control resource set identifier, the frequency location of the control resource set, the symbol length of the control resource set, etc. For example, the information provided by the base station to the terminal may include pieces of information below.

TABLE 7

```
ControlResourceSet ::=          SEQUENCE {
-- Corresponds to L1 parameter 'CORESET-ID'
controlResourceSetId            ControlResourceSetId,
(control resource set identifier(Identity))
frequencyDomainResources        BIT STRING (SIZE (45)),
(frequency axis resource assignment information)
duration                        INTEGER (1..maxCoReSetDuration),
(time axis resource assignment information)
cce-REG-MappingType             CHOICE {
(CCE-to-REG mapping scheme)
    interleaved                 SEQUENCE {
    reg-BundleSize              ENUMERATED {n2, n3, n6},
    (REG bundle size)
    precoderGranularity         ENUMERATED  {sameAsREG-
bundle, allContiguousRBs},
    interleaverSize             ENUMERATED {n2, n3, n6}
    (interleaver size)
    shiftIndex
  INTEGER(0..maxNrofPhysicalResourceBlocks-1)
  OPTIONAL
    (interleaver shift)
    },
    nonInterleaved              NULL
},
    tci-StatesPDCCH                    SEQUENCE(SIZE (1..maxNrofTCI-
StatesPDCCH)) OF TCI-StateId   OPTIONAL,
    (QCL configuration information)
    tci-PresentInDCI               ENUMERATED {enabled}
                                   OPTIONAL, -- Need S
}
```

Figure 5:
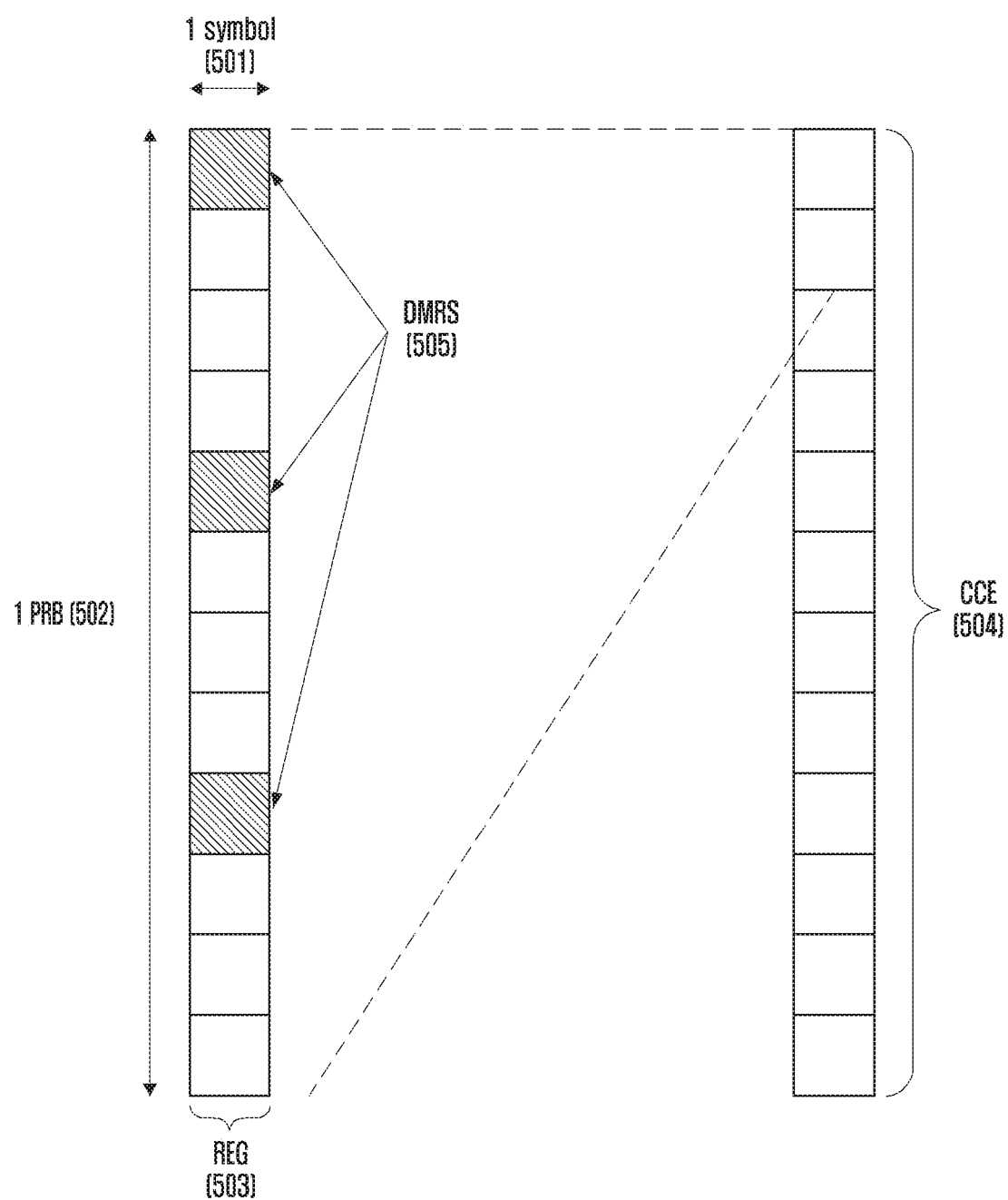
FIG. 5 illustrates a structure of a downlink control channel in a 5G communication system according to an embodiment of the disclosure.

FIG. 5 illustrates a basic unit of time and frequency resources configuring a downlink control channel, which can be used in 5G technology according to an embodiment of the disclosure.

Referring to FIG. 5, a basic unit of time and frequency resources configuring a control channel is named a resource element group (REG) 503, and the REG 503 may be defined as one OFDM symbol 501 in a time axis and one physical resource block (PRB) 502 in a frequency axis, that is, may be defined as 12 subcarriers. A base station connects and attaches REGs 503 described above to each other to configure a downlink control channel assignment unit.

Referring to FIG. 5, if a basic unit for the assignment of a downlink control channel in 5G technology is a control channel element (CCE) 504, one CCE 504 may be configured by a plurality of the REGs 503. For example, the REG 503 illustrated in FIG. 5 may be configured by 12 REs, and if one CCE 504 is configured by six REGs 503, the one CCE 504 may be configured by 72 REs. If a downlink control resource set is configured, the control resource set may be configured by a plurality of CCEs 504, and a particular downlink control channel may be transmitted after being mapped to one CCE 504 or a plurality of CCEs 504 according to an aggregation level (AL) in the control resource set. CCEs 504 in a control resource set are distinguished by numbers, and the numbers may be assigned according to a logical mapping scheme.

The basic unit of a downlink control channel, illustrated in FIG. 5, that is, an REG 503, may include REs to which DCI is mapped and a region to which a DMRS 505 which is a reference signal for decoding the REs is mapped. As illustrated in FIG. 5, three DMRSs 505 may be transmitted in one REG 503.

The number of CCEs required for transmitting a PDCCH may be 1, 2, 4, 8, and 16 according to aggregation levels (ALs), and different numbers of CCEs may be used to implement the link adaptation of the downlink control channel. For example, if AL=L, one downlink control channel may be transmitted through L number of CCEs. A terminal is required to detect a signal in the state where the terminal does not know information relating to a downlink control channel, and a search space indicating a set of CCEs is defined for blind decoding. A search space is a set of downlink control channel candidates configured by CCEs to which the terminal is required to attempt to decode at a given aggregation level, and since there are various aggregation levels grouping 1, 2, 4, 8, and 16 CCEs into one, respectively, the terminal has a plurality of search spaces. A search space set may be defined to be a set of search spaces at all the configured aggregation levels.

Search spaces may be classified into a common search space (CSS) and a UE-specific search space (USS). A particular group of terminals or all the terminals may investigate a common search space for a PDCCH to receive cell-common control information, such as a paging message or dynamic scheduling for system information. For example, the terminals may investigate a common search space for a PDCCH to receive PDSCH scheduling assignment information for transmission of a SIB including cell operator information. In the case of a common search space, a particular group of terminals or all the terminals are required to receive a PDCCH, and thus the common search space may be defined to be a pre-promised set of CCEs. The terminals may investigate a UE-specific search space for a PDCCH to receive scheduling assignment information for a UE-specific PDSCH or PUSCH. A user equipment (UE)-specific search space may be defined UE-specifically by using the identity of a terminal and the functions of various system parameters.

In 5G technology, a parameter for a search space for a PDCCH may be configured for a terminal by a base station through higher layer signaling (e.g., SIB, MIB, and RRC signaling) For example, the base station may configure, for the terminal, the number of PDCCH candidates at each aggregation level L, a monitoring period for a search space, a monitoring occasion in the units of symbols in a slot of a search space, a search space type (common search space or UE-specific search space), a combination of an RNTI and a DCI format to be monitored in a corresponding search space, and the index of a control resource set in which a search space is to be monitored. For example, the information configured for the terminal by the base station may include pieces of information below.

TABLE 8

```
SearchSpace ::=                          SEQUENCE {
-- Identity of the search space. SearchSpaceId = 0 identifies the SearchSpace
configured via PBCH (MIB) or ServingCellConfigCommon.
    searchSpaceId                        SearchSpaceId,
    (search space identifier)
    controlResourceSetId                 ControlResourceSetId,
    (control resource set identifier)
    monitoringSlotPeriodicityAndOffset   CHOICE {
    (monitoring slot level period)
        sl1                              NULL,
        sl2                              INTEGER (0..1),
        sl4                              INTEGER (0..3),
        sl5                              INTEGER (0..4),
        sl8                              INTEGER (0..7),
        sl10                             INTEGER (0..9),
        sl16                             INTEGER (0..15),
        sl20                             INTEGER (0..19)
    }
                                OPTIONAL,
    monitoringSymbolsWithinSlot          BIT STRING (SIZE (14))
                                OPTIONAL,
    (monitoring symbols in slot)
    nrofCandidates                       SEQUENCE {
    (the number of PDCCH candidates for each aggregation level)
        aggregationLevel1                ENUMERATED {n0, n1, n2, n3, n4, n5,
n6, n8},
        aggregationLevel2                ENUMERATED {n0, n1, n2, n3, n4, n5,
n6, n8},
        aggregationLevel4                ENUMERATED {n0, n1, n2, n3, n4, n5,
n6, n8},
        aggregationLevel8                ENUMERATED {n0, n1, n2, n3, n4, n5,
n6, n8},
        aggregationLevel16               ENUMERATED {n0, n1, n2, n3, n4,
n5, n6, n8}
    },
```

TABLE 8-continued

```
searchSpaceType                 CHOICE {
(search space type)
-- Configures this search space as common search space (CSS) and DCI
formats to monitor.
    common                      SEQUENCE {
    (common search space)
    }
    ue-Specific                 SEQUENCE {
    (UE-specific search space)
    -- Indicates whether the UE monitors in this USS for DCI formats 0-0 and 1-0
or for formats 0-1 and 1-1.
        formats                 ENUMERATED {formats0-0-And-1-0,
formats0-1-And-1-1},
    ...
    }
```

The base station may configure one search space set or a plurality of search space sets for the terminal according to the configuration information. For example, the base station may configure, for the terminal, search space set 1 and search space set 2, in search space set 1, DCI format A scrambled by X-RNTI may be configured to be monitored in a common search space, and in search space set 2, DCI format B scrambled by Y-RNTI may be configured to be monitored in a UE-specific search space.

According to the configuration information, one search space set or a plurality of search space sets may exist in a common search space or a UE-specific search space. For example, search space set #1 and search space set #2 may be configured to be common search spaces, and search space set #3 and search space set #4 may be configured to be UE-specific search spaces.

In a common search space, combinations of a DCI format and a RNTI as below may be monitored.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In a UE-specific search space, combinations of a DCI format and a RNTI as below may be monitored.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The described types of RNTIs may follow the definitions and purposes below.

Cell RNTI (C-RNTI): the purpose of scheduling a UE-specific PDSCH

Temporary Cell RNTI (TC-RNTI): the purpose of scheduling a UE-specific PDSCH

Configured Scheduling RNTI (CS-RNTI): the purpose of scheduling semi-statically configured UE-specific PDSCH Random Access RNTI (RA-RNTI): the purpose of scheduling a PDSCH in a random access stage Paging RNTI (P-RNTI): the purpose of scheduling a PDSCH on which paging is transmitted System Information RNTI (SI-RNTI): the purpose of scheduling a PDSCH on which system information is transmitted Interruption RNTI (INT-RNTI): the purpose of notifying of whether a PDSCH is punctured Transmit Power Control for PUSCH RNTI (TPC-PUSCH-RNTI): the purpose of indicating a power control command for a PUSCH Transmit Power Control for PUCCH RNTI (TPC-PUCCH-RNTI): the purpose of indicating a power control command for a PUCCH Transmit Power Control for SRS RNTI (TPC-SRS-RNTI): the purpose of indicating a power control command for a sounding reference signal (SRS)

The described DCI formats may follow the definitions below.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G technology, a search space of aggregation level L in control resource set p and search space set s may be expressed as in equation 1 below.

$$L \cdot \left\{ \left( Y_{p,n_{s,f}^\mu} + \left\lfloor \frac{m_{s,n_{CI}} \ast N_{CCE,p}}{L \ast M_{p,s,max}^{(L)}} \right\rfloor + n_{CI} \right) \mod \lfloor N_{CCE,p}/L \rfloor \right\} + i \quad \text{Equation 1}$$

L: aggregation level $n_{CI}$: carrier index $N_{CCE,p}$: the total number of CCEs existing in control resource set p $n_{s,f}^\mu$: slot index $M_{p,s,max}^{(L)}$: the number of PDCCH candidates of aggregation level L $m_{s,n_{CI}}=0, \ldots, M_{p,s,max}^{(L)}-1$: the indice of PDCCH candidates of aggregation level L i=0, . . . , L−1

$Y_{p,n_{s,f}^\mu}=(A_p \ast Y_{p,n_{s,f}^\mu-1}) \mod D$, $Y_{p,-1}=n_{RNTI} \neq 0$, $A_0=39827$, $A_1=39829$, $A_2=39839$, D=65537

$n_{RNTI}$: terminal identifier

In a case of a common search space, $Y\_(p,n_{s,f}^\mu)$ may be 0.

In a case of a UE-specific search space, $Y\_(p,n^\mu_{s,f})$ may be changed according to a time index and the identity (C-RNTI or ID configured for a terminal by a base station) of a terminal.

Hereinafter, a sleep mode of a terminal will be described.

A terminal may minimize the power consumption by operating in a sleep mode in a time interval (T) during which the terminal is not required to perform any transmission or reception. A terminal may operate in one of three sleep modes below according to the length of a time interval T during which the terminal can operate in a sleep mode.

Deep sleep: which is a sleep mode operable in a case of $T>T_{ds}$. The mode may operate a terminal with the lowest power consumption, and in the mode, the terminal may perform only minimum baseband operations, and a radio frequency (RF) circuit may also be deactivated. A relatively long transient time may be required for a terminal having operated in a deep sleep mode to operate in an active mode (e.g., active mode allowing transmission or reception). $T_{ds}$ may be defined as a minimum time interval required for a terminal to operate in a deep sleep mode.

Light sleep: which may correspond to a sleep mode operable in a case of $T_{ls}<T\leq T_{ds}$. The mode may operate a terminal with a low power consumption, and may require a transient time relatively smaller than that in a deep sleep mode. $T_{ls}$ may be defined as a minimum time interval required for a terminal to operate in a light sleep mode.

Micro sleep: which may correspond to a sleep mode operable in a case of $T_{ms}<T\leq T_{ls}$. The mode may operate a terminal with a relatively low power consumption, and may require a very short transient time or no transient time to be changed into an active mode. $T_{ms}$ may be defined as a minimum time interval required for a terminal to operate in a micro sleep mode.

A sleep mode in which a terminal can operate may correspond to at least one of a deep sleep, light sleep, or micro sleep according to the length of a time interval T during which the terminal can operate in a sleep mode in accordance with the definitions. In the following description, deep sleep, light sleep, and micro sleep will be collectively named a sleep mode without distinction thereof.

Hereinafter, embodiments will be described with reference to the accompanying drawings. Although a 5G system will be described as an example of the following embodiments, embodiments can be applied to other communication systems having the similar technical backgrounds or channel form. For example, the communication systems may include LTE or LTE-A mobile communication, and mobile communication technology developed after 5G. Therefore, an embodiment may be also applied to another communication system through partial modification without departing from the scope of the disclosure as a determination of a person who skilled in the art.

In the following description of the disclosure, a detailed description of related functions or configurations incorporated herein will be omitted when it may make the subject matter of the disclosure rather unclear. The terms as described below are defined in consideration of the functions in the disclosure, and the meaning of the terms may vary according to the intention of a user or operator, convention, or the like. Therefore, the definitions of the terms should be made based on the contents throughout the specification.

First Embodiment

A base station may configure, for a terminal, a table relating to time domain resource allocation information for a downlink data channel (PDSCH) and an uplink data channel (PUSCH) through higher layer signaling (e.g., RRC signaling). The base station may configure, for a PDSCH, a table configured by a maximum of 16 entries (maxNrofDL-Allocations=16), and may configure, for a PUSCH, a table configured by a maximum of 16 entries (maxNrofUL-Allocations=16). Time domain resource allocation (TD-RA) information may include, for example, PDCCH-to-PDSCH slot timing (i.e., a time gap in the units of slots, between a time point at which a PDCCH is received, and a time point at which a PDSCH scheduled by the received PDCCH is transmitted, the timing is indicated by $K_0$) or PDCCH-to-PUSCH slot timing (i.e., a time gap in the units of slots, between a time point at which a PDCCH is received, and a time point at which a PUSCH scheduled by the received PDCCH is transmitted, the timing is indicated by $K_2$), information relating to the location of a starting symbol of a PDSCH or a PUSCH scheduled in a slot, and the scheduled length, a mapping type of a PDSCH or a PUSCH, and the like. For example, a terminal may be notified of pieces of information as shown in tables 10 and 11 below by a base station.

TABLE 10

PDSCH-TimeDomainResourceAllocationList information element
PDSCH-TimeDomainResourceAllocationList ::= SEQUENCE (SIZE(1..maxNrofDL-Allocations)) OF
PDSCH-TimeDomainResourceAllocation
   PDSCH-TimeDomainResourceAllocation ::= SEQUENCE {
   k0                                                        INTEGER(0..32)
OPTIONAL, -- Need S
   (PDCCH-to-PDSCH timing in units of slots)
   mappingType                ENUMERATED {typeA, typeB},
   (PDSCH mapping type)
   startSymbolAndLength            INTEGER (0..127)
   (The length and a starting symbol of a PDSCH)
}

TABLE 11

PUSCH-TimeDomainResourceAllocation information element
PUSCH-TimeDomainResourceAllocationList ::= SEQUENCE (SIZE(1..maxNrofUL-Allocations)) OF
PUSCH-TimeDomainResourceAllocation
   PUSCH-TimeDomainResourceAllocation ::= SEQUENCE {
   k2                 INTEGER(0..32)        OPTIONAL,
                                                              -- Need S
   (PDCCH-to-PUSCH timing in units of slots)
   mappingType                ENUMERATED {typeA, typeB},
   (PUSCH mapping type)
   startSymbolAndLength           INTEGER (0..127)
   (The length and a starting symbol of a PUSCH)
}

The base station may notify the terminal of one of the entries of the table relating to the time domain resource allocation information through L1 signaling (e.g., DCI) (e.g., the base station may indicate one of the entries to the terminal through "a time domain resource allocation field" in DCI). The terminal may obtain time domain resource allocation information relating to a PDSCH or PUSCH, based on DCI received from the base station.

The terminal can reduce the power consumption by differently operating sleep mode operations described above, based on time domain resource allocation information for a PDSCH, configured by the base station.

Figure 6:
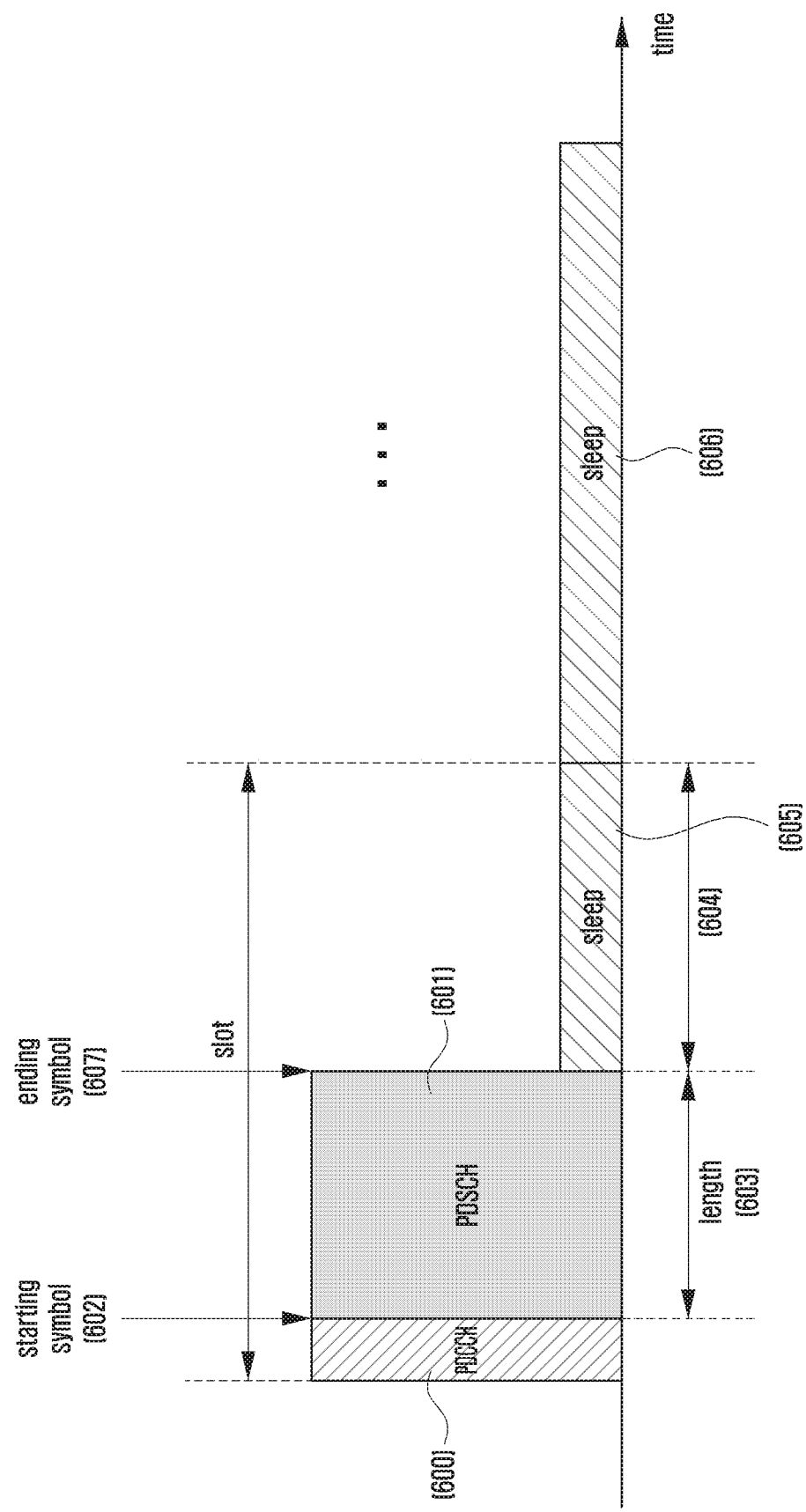
FIG. 6 illustrates operations according to a first embodiment of the disclosure.

FIG. 6 illustrates a sleep mode operation based on time domain resource allocation information for a PDSCH according to an embodiment of the disclosure.

Referring to FIG. 6, a terminal may receive a PDCCH 600 and then perform blind decoding, and if a PDSCH 601 scheduled by the PDCCH 600 exists, the terminal may receive the scheduled PDSCH 601. The terminal may operate in a sleep mode 605 during a time 604 remaining in a slot after the PDSCH 601 is received, according to time domain resource allocation information of the scheduled PDSCH 601, for example, a starting symbol 602 and a length 603 of the PDSCH 601. In an example shown in FIG. 6, the terminal may operate in the sleep mode 605 from a time point after an ending symbol 607 of the PDSCH 601. Therefore, as the ending symbol 607 of the PDSCH 601 appears earlier in the slot, an interval during which the terminal can operate in the sleep mode 605 in the slot may increase, and accordingly, the power consumption of the terminal can be reduced.

A terminal may finally obtain time domain scheduling information of a PDSCH when decoding is completed after reception of a PDCCH. Therefore, the terminal is unable to determine whether the PDSCH is scheduled, during a time interval in which the terminal receives and decodes the PDCCH, and thus the terminal may be required to perform buffering on OFDM symbols to which the PDSCH may be scheduled, whereby the power consumption of the terminal may be largely increased. If the terminal can previously obtain time domain resource allocation information of the PDSCH before decoding the PDCCH, the terminal can minimize unnecessary buffering for the PDSCH to reduce the power consumption.

As described above, a base station may configure, for a terminal, a table for time domain resource allocation for a PDSCH. The terminal can expect time domain resource allocation for a PDSCH in the table configured by the base station, and thus may previously identify a maximum value of an ending symbol to which the PDSCH may be scheduled, based on the values in the configured table. For example, if a table relating to time domain resource allocation as shown in table 12 is configured for a terminal, the terminal may expect that the maximum value of an ending symbol of a PDSCH is the twelfth symbol in a slot. In this case, the terminal is not required to perform PDSCH buffering on thirteenth and fourteenth symbols in the slot, and thus can operate in a sleep mode 606 in the thirteenth and fourteenth symbols, whereby the power consumption can be reduced.

TABLE 12

| Row index | PDSCH mapping type | $k_0$ | Starting symbol | Length |
|---|---|---|---|---|
| 1 | Type A | 2 | 2 | 8 |
| 2 | Type A | 2 | 2 | 10 |
| 3 | Type A | 2 | 2 | 9 |
| 4 | Type A | 2 | 2 | 7 |
| 5 | Type A | 3 | 2 | 5 |
| 6 | Type B | 3 | 9 | 4 |
| 7 | Type B | 3 | 4 | 4 |
| 8 | Type B | 4 | 5 | 7 |
| 9 | Type B | 5 | 5 | 2 |
| 10 | Type B | 7 | 9 | 2 |
| 11 | Type B | 8 | 12 | 1 |
| 12 | Type A | 9 | 1 | 10 |
| 13 | Type A | 10 | 1 | 6 |
| 14 | Type A | 21 | 2 | 4 |
| 15 | Type B | 30 | 4 | 7 |
| 16 | Type B | 32 | 8 | 4 |

It is important to maximize an interval during which a terminal can operate in a sleep mode, in order to minimize the power consumption of the terminal. For example, minimizing of a time domain resource allocation region to which a PDSCH may be scheduled in a slot may be preferred in view of the power consumption of a terminal. In accordance with the aspect described above, at least one of methods below or a combination of one or more of them may be considered.

Method 1

A base station may configure, for a terminal, a time domain resource allocation table for a PDSCH through higher layer signaling (e.g., RRC). The base station may configure parameters in the table, which are effective (e.g., parameters maximizing a sleep interval of the terminal or minimizing PDSCH buffering of the terminal) for reducing the power consumption of the terminal. For example, the base station may configure parameters satisfying conditions below for the terminal.

$K_0=0$ startSymbolAndLength (start symbol and length): which is configured such that a value corresponding to the location of an ending symbol of a PDSCH is smaller than $X_{max}$. $X_{max}$ may correspond to the maximum value among available values as time points at which the PDSCH ends in a slot.

Method 1-1

A terminal may request a base station to configure a time domain resource allocation table by using method 1 above. For example, the terminal may transmit a request to the base station so that the terminal operates in a power saving mode (PSM), through higher layer signaling (e.g., RRC) or L1 signaling (e.g., physical uplink control channel, PUCCH). The base station having received a power saving mode request message from the terminal may configure, for the terminal, a time domain resource allocation table by using method 1 above.

Method 2

A base station may configure, for a terminal, a time domain resource allocation table for a PDSCH through higher layer signaling (e.g., RRC). The base station may additionally configure or indicate, for or to the terminal, $X_{max}$ through higher layer signaling (e.g., RRC) or L1 signaling (e.g., DCI). On the basis of $X_{max}$ notified of by the base station, the terminal may expect indicating of only a time domain resource allocation value allowing the location value of an ending symbol of a PDSCH to be smaller than or equal to $X_{max}$ in the time domain resource allocation table configured by the base station. For example, the terminal may not expect that a PDSCH is scheduled to a value larger than $X_{max}$ in the time domain.

Method 2-1

A terminal may request a base station to configure a time domain resource allocation table by using method 2 above. For example, the terminal may transmit a request to the base station so that the terminal operates in a power saving mode (PSM), through higher layer signaling (e.g., RRC) or L1 signaling (e.g., PUCCH). The base station having received a power saving mode request message from the terminal may configure, for the terminal, a time domain resource allocation table by using method 2 above.

Method 3

A terminal may notify a base station of $X_{max}$ through higher layer signaling (e.g., RRC) or L1 signaling (e.g., PUCCH). By considering $X_{max}$ received from the terminal, the base station may configure, for the terminal, a time domain resource allocation table for a PDSCH through higher layer signaling (e.g., RRC). For example, the base station may configure a time domain resource allocation table with only time domain resource allocation values allowing the location value of an ending symbol of a PDSCH to be smaller than or equal to $X_{max}$, and may provide the table to the terminal. The terminal may not expect that a PDSCH is scheduled to a value larger than $X_{max}$ in the time domain.

Method 3-1

A base station may request a terminal to notify the base station of information relating to $X_{max}$ by using method 3 above. For example, the base station may request the terminal to operate in a power saving mode (PSM) through higher layer signaling (e.g., RRC) or L1 signaling (e.g., PDCCH). The terminal having received a power saving mode operation message from the base station may notify the base station of information relating to $X_{max}$ by using method 3 above.

Second Embodiment

In 5G technology, a base station may configure, for a terminal, a discontinuous reception (DRX) operation through higher layer signaling (e.g., RRC). The terminal for which DRX has been configured may monitor a PDCCH during a time interval defined as an active time in every predetermined period configured by a DRX cycle, and may perform a series of operations (e.g., transmission or reception of data and CSI reporting) according to the contents of control information received through the PDCCH. The base station may configure, for the terminal, the parameters below, related to DRX.

drx-onDurationTimer: the duration at the beginning of a DRX Cycle;

drx-SlotOffset: the delay before starting the drx-onDurationTimer;

drx-InactivityTimer: the duration after the PDCCH occasion in which a PDCCH indicates a new UL or DL transmission for the MAC entity;

drx-RetransmissionTimerDL (per DL HARQ (hybrid automatic repeat request) process except for the broadcast process): the maximum duration until a DL retransmission is received;

drx-RetransmissionTimerUL (per UL HARQ process): the maximum duration until a grant for UL retransmission is received;

drx-LongCycleStartOffset: the Long DRX cycle and drx-StartOffset which defines the subframe where the Long and Short DRX Cycle starts;

drx-ShortCycle (optional): the Short DRX cycle;

drx-ShortCycleTimer (optional): the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity.

If DRX is configured, an active time may satisfy conditions below.

drx-onDurationTimer or drx-InactivityTimer or drx-RetransmissionTimerDL or drx-RetransmissionTimerUL or ra-ContentionResolutionTimer (as described in subclause 5.1.5) is running;

a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble.

Figure 7:
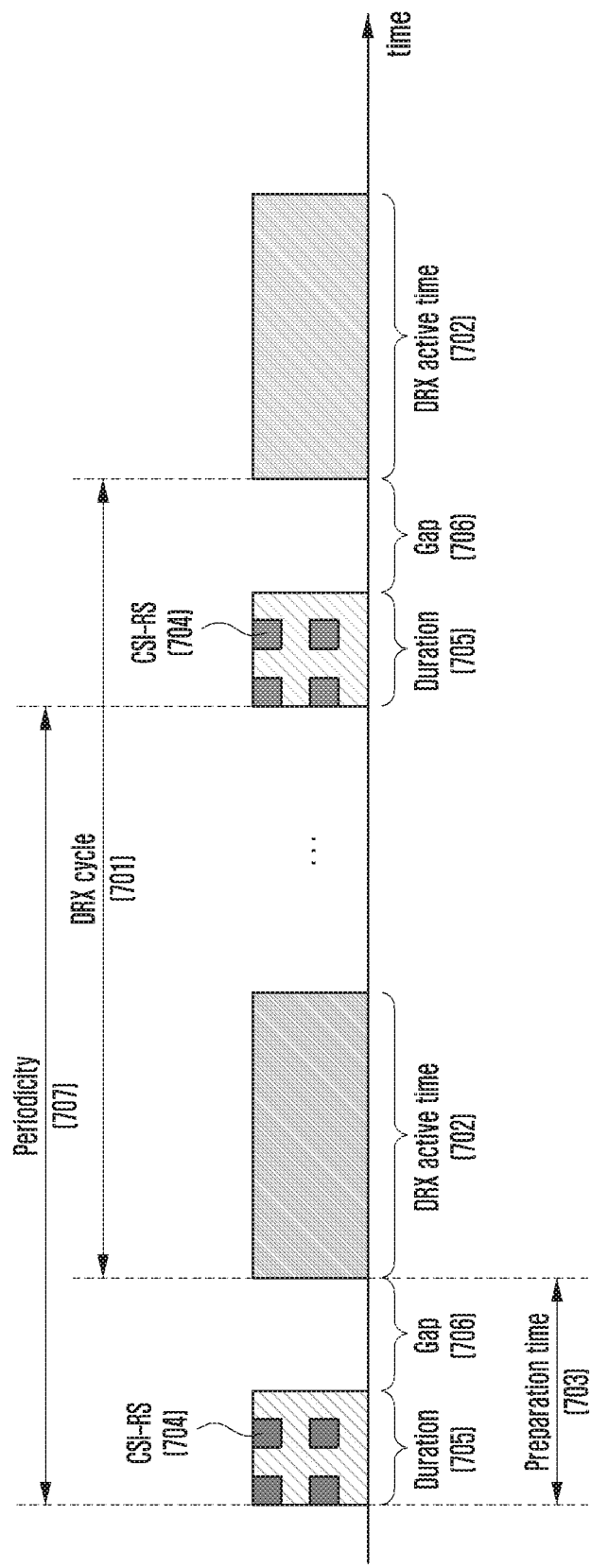
FIG. 7 illustrates operations according to a second embodiment of the disclosure.

FIG. 7 illustrates a DRX operation of a terminal according to an embodiment of the disclosure, considered for the disclosure.

Referring to FIG. 7, a terminal may monitor and transmit or receive a PDCCH during a DRX active time 702 in every time period corresponding to a DRX cycle 701. During a time remaining after the DRX active time 702 is subtracted, the terminal may generally operate in a sleep mode and may perform a channel tracking operation, a channel measurement operation, and the like if needed.

If the DRX cycle 701 is lengthily configured, and thus the terminal operates in a sleep mode for a long time and then wakes up in the DRX active time 702 to monitor a PDCCH, the terminal may additionally require a time for performing a series of operations (e.g., channel measurement, channel tracking, automatic gain control (AGC)) of preparing each element of a baseband (BB) and a radio frequency (RF) required for PDCCH monitoring. Hereinafter, the time for performing the operations is referred to as a preparation time. The terminal may perform the preparation operations by using a reference signal (e.g., synchronization signal (SS), channel state information reference signal (CSI-RS), and DMRS) transmitted by the base station.

The preparation operations will be described below with reference to FIG. 7.

Referring to FIG. 7, the terminal may be previously activated before a time interval corresponding to the DRX active time 702, to perform the preparation operations during a preparation time 703 corresponding to a particular time interval. The preparation time 703 of the terminal may be configured by a time region receiving a reference signal 704 and a time (named a gap 706) required for processing the received reference signal 704. In some cases, the gap 706 may exist or not. The base station may transmit a reference signal (which may correspond to a CSI-RS in the example shown in FIG. 7) to the terminal in the preparation time 703. The terminal may perform a preparation operation by using the reference signal 704 received from the base station.

If transmission of a reference signal for a preparation operation is performed without considering of DRX configuration, the terminal monitoring the reference signal for the preparation operation may disadvantageously consume large power. For example, if a DRX occasion and the transmission of a reference signal are not aligned, or a reference signal transmission period is configured to be very short, compared to a DRX cycle, the terminal may be additionally required to wake up and operate in an active mode to monitor the reference signal in a DRX inactive time interval. In this case, a time interval in which the terminal can operate in a sleep mode may be reduced, and accordingly, the power consumption of the terminal may be increased.

In relation to the second embodiment, various embodiments relating to a method for effectively supporting transmission of a reference signal for a preparation operation in order to reduce the power consumption of a terminal will be proposed.

(2-1)th Embodiment

A terminal may be notified of various parameters relating to transmission of a reference signal 704 for a preparation operation through higher layer signaling (e.g., RRC signaling) by a base station.

The reference signal 704 for a preparation operation may be configured to have a particular periodicity 707 for transmission, and may be transmitted during a particular duration 705 in each transmission occasion. In one transmission occasion duration 705, the reference signal 704 may be mapped to have a particular pattern (mapping of time and frequency resources) for transmission, and the reference signal 704 having the pattern may be periodically repeatedly transmitted. The reference signal 704 for a preparation operation may be configured and transmitted before a DRX occasion (or before DRX active time 702) or configured and transmitted in an initial time interval of a DRX active time 702.

First, a transmission periodicity 707 of a reference signal 704 may be determined by at least one of methods below or a combination of one or more of them.

Method 1

A base station may explicitly configure, for a terminal, an offset and a transmission periodicity 707 of a reference signal 704. For example, the base station may notify the terminal of an offset and a transmission periodicity 707 of a reference signal 704 in the units of slots or in millisecond (ms) units. The terminal may receive the reference signal 704 according to the offset configuration and the transmission periodicity 707 of the reference signal 704, configured by the base station.

Method 2

An offset and a transmission periodicity 707 of a reference signal 704 may be implicitly configured based on a pre-configured DRX configuration. For example, a transmission periodicity 707 of a reference signal 704 may be identical to a DRX cycle 701. A time offset of a reference signal 704 may be determined by a gap 706 between a DRX active interval 702 and the transmission of the reference signal 704. For example, a transmission location of a reference signal 704 in a particular transmission occasion may be determined by a gap between a starting point of a DRX active interval 702 and an ending point of a reference signal 704. A time offset of a reference signal 704 may be determined by a gap between a DRX active interval 702 and a preparation time 703. For example, the transmission of a reference signal 704 may start after a start point of a DRX active interval 702 before a time interval corresponding to a preparation time 703. The terminal may determine a transmission region of a reference signal 704, based on a DRX configuration notified of by the base station, and a predefined or pre-configured information on a preparation time 703 or a gap 706, and may receive the reference signal 704, based on the determination.

Next, a transmission duration 705 of a reference signal 704 may be determined by at least one of methods below or a combination of one or more of them.

Method 1

A base station may explicitly configure, for a terminal, a transmission duration 705 of a reference signal 704. For example, the base station may notify the terminal of a transmission duration 705 of a reference signal 704 in the units of slots or in millisecond (ms) units. The terminal may receive the reference signal 704 according to the transmission duration 705 of the reference signal 704, configured by the base station.

Method 2

A transmission duration 705 of a reference signal 704 may be implicitly configured based on a pre-configured DRX configuration. For example, a transmission duration 705 of a reference signal 704 may be determined to be increased in proportion to a DRX cycle 701. More specifically, a longer DRX cycle 701 may require a reference signal 704 mapped to more resources in the time and frequency domain for a preparation operation. Therefore, if a DRX cycle 701 is larger than a random Xcycle ms, a transmission duration 705 of a reference signal 704 may be determined to be larger than another random YRS ms. A relationship between a DRX cycle 701 and a transmission duration 705 may be configured for the terminal by the base station through higher layer signaling (e.g., RRC) or L1 signaling (e.g., DCI), or may be predefined by a system parameter. The terminal may determine a transmission duration 705 of a reference signal 704, based on a DRX configuration notified of by the base station, and may receive the reference signal 704, based on the determination.

Method 3

A transmission duration 705 of a reference signal 704 may be implicitly determined based on a reception signal quality (e.g., reference signal received power (RSRP) and reference signal received quality (RSRQ)) of a terminal. More specifically, a low reception signal quality of the terminal may require a reference signal 704 mapped to more resources in the time and frequency domain for a preparation operation. Therefore, if a reception signal quality is smaller than a random $X_{SNR}$ dB, a transmission duration 705 of a reference signal 704 may be determined to be larger than another random $Y_{RS}$ ms. A relationship between a reception signal quality and a transmission duration 705 may be configured for the terminal by the base station through higher layer signaling (e.g., RRC) or L1 signaling (e.g., DCI), or may be predefined by a system parameter. The terminal may determine a transmission duration 705 of a reference signal 704, based on a reception signal quality, and may receive the reference signal 704, based on the determination.

The terminal may notify the base station of preferred values of various parameters relating to transmission of a reference signal 704 for a preparation operation through higher layer signaling (e.g., RRC), L1 signaling (e.g., PUCCH), or UE capability reporting. For example, the terminal may transmit at least one of parameters below to the base station.

A preferred transmission periodicity 707 of a reference signal

A preferred transmission duration 705 of a reference signal

A preferred offset of a reference signal

A preferred gap 706 between a reference signal transmission occasion and a DRX active time 702

A preferred preparation time 703

The base station may determine a transmission parameter of the reference signal 704, based on a value of a preferred parameter notified of by the terminal, and may configure the transmission parameter for the terminal.

The above reference signal for a preparation operation according to the (2-1)th embodiment may include a synchronization signal, a CSI-RS, a CSI-RS for mobility, a CSI-RS for tracking, a DMRS, and like.

The above methods and operations in the (2-1)th embodiment may be also identically applied to a reference signal having another general purpose (e.g., channel estimation, channel measurement, or mobility) as well as a reference signal for a preparation operation.

The above methods and operations in the (2-1)th embodiment may be applied to a case where a configured DRX cycle is larger than or equal to X ms. X may correspond to at least one of {10, 20, 32, 40, 60, 64, 70, 80, 128, 160, 256, 320, 512, 640, 1024, 1280, 2048, 2560, 5120, 10240} ms.

The above methods and operations in the (2-1)th embodiment may be also applied to a case where an operation mode is not a DRX mode, in the same way. If an operation mode is not a DRX mode, a reference signal transmission method may be determined based on a PDCCH monitoring period and occasion. In the method, a DRX cycle may correspond to a PDCCH monitoring period, a DRX occasion may correspond to a PDCCH monitoring occasion, and on the basis of the DRX cycle and occasion, the above detailed methods in the (2-1)th embodiment may be applied in the same way.

The above methods and operations in the (2-1)th embodiment may be restrictively applied to long DRX or enhanced DRX (eDRX).

(2-2)th Embodiment

Figure 8:
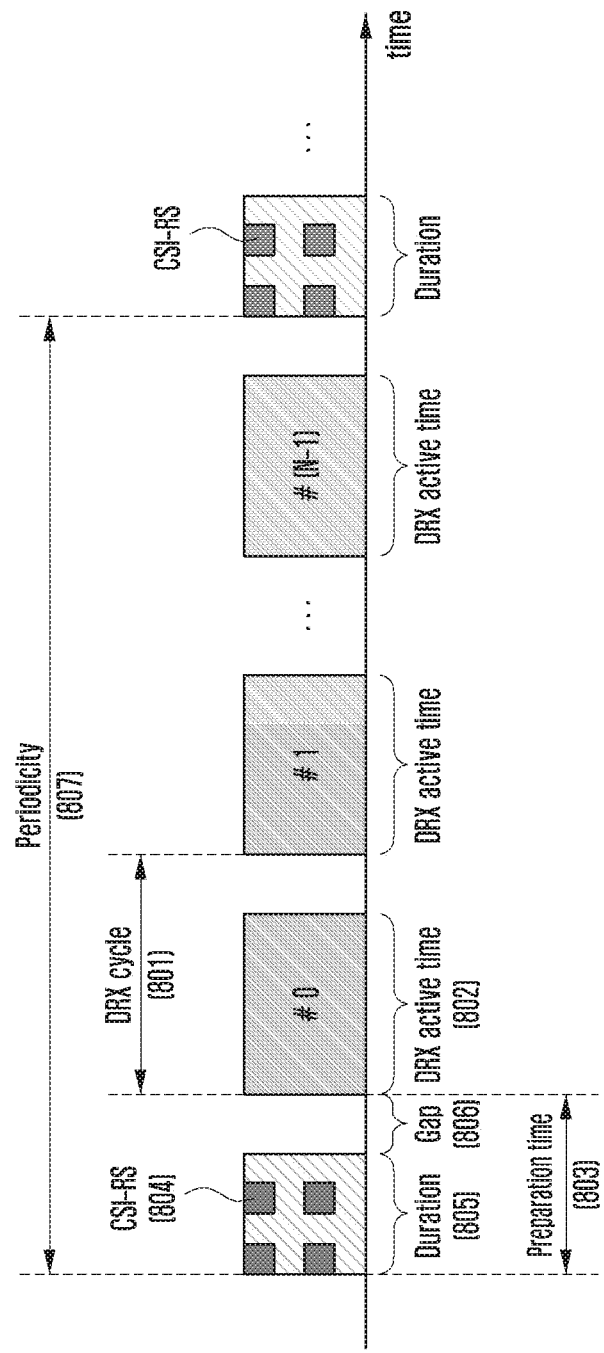
FIG. 8 illustrates operations according to a (2-2)th embodiment of the disclosure.

FIG. 8 illustrates a (2-2)th embodiment of the disclosure.

Referring to FIG. 8, a terminal may be notified by a base station of various parameters relating to transmission of a reference signal 804 for a preparation operation through higher layer signaling (e.g., RRC).

The reference signal 804 for a preparation operation may be configured to have a particular periodicity 807 for transmission, and may be transmitted during a particular duration 805 in each transmission occasion. In one transmission occasion duration 805, the reference signal 804 may be mapped to have a particular pattern (mapping of time and frequency) for transmission, and the reference signal 804 having the pattern may be periodically repeatedly transmitted. The reference signal 804 for a preparation operation may be configured and transmitted before a DRX occasion (or before DRX active time 802) or configured and transmitted in an initial time interval of a DRX active time 702.

Referring to FIG. 8, a transmission periodicity 807 of the reference signal 804 may be configured to be greater than or equal to a DRX cycle 801. Accordingly, a preparation time 803 for a single preparation operation and transmission of the reference signal 804 for the operation may be related to multiple DRX occasions. In an example illustrated in FIG. 8, the transmission periodicity 807 of the reference signal 804 may be configured to include a total of N number of DRX occasions (#0, #1, . . . , and #(N−1)). The terminal may perform a preparation operation for monitoring a PDCCH in a total of N number of DRX occasions, during a preparation time 803 existing before a first DRX occasion (#0) among the N number of DRX occasions.

The base station may explicitly configure, for the terminal, an offset and a transmission periodicity 807 of a reference signal 804 through higher layer signaling (e.g., RRC) or L1 signaling (e.g., PDCCH).

The base station may allow the terminal to implicitly determine an offset and a transmission periodicity 807 of a reference signal 804, based on pre-configured DRX configuration information, or may additionally configure, for the terminal, the offset and the transmission periodicity through higher layer signaling (e.g., RRC) or L1 signaling (e.g., PDCCH). For example, the transmission periodicity 807 of the reference signal 804 may be configured to be N times of the DRX cycle 801, and N may be previously defined, or N may be configured by the base station for the terminal through higher layer signaling (e.g., RRC) or L1 signaling (e.g., PDCCH). For example, the offset of the reference signal 804 may be determined by a gap 806 that is a time interval between an occasion (which may correspond to #0 in FIG. 8) of the initial DRX cycle 801 related to the transmission of the reference signal 804 and the transmission of the reference signal 804. A value of the gap 806 may be previously defined, or may be configured by the base station for the terminal through higher layer signaling (e.g., RRC) or L1 signaling (e.g., PDCCH).

The terminal may receive a reference signal 804, based on a configuration of the reference signal 804, notified by the base station, and may perform a preparation operation by using the received reference signal 804.

The terminal may notify the base station of preferred values of various parameters relating to transmission of a reference signal 804 for a preparation operation through higher layer signaling (e.g., RRC), L1 signaling (e.g., PUCCH), or UE capability reporting. For example, the terminal may transmit at least one of parameters below to the base station.

A preferred transmission periodicity 807 of a reference signal

A preferred transmission duration 805 of a reference signal

A preferred offset of a reference signal

A preferred gap 806 between a reference signal transmission occasion and a DRX active time 802

A preferred preparation time 803

A preferred correlation between a reference signal and a DRX occasion (e.g., If the transmission of one reference signal is related to N number of DRX occasions, a correlation therebetween is N)

The base station may determine a transmission parameter of the reference signal 804, based on a value of a preferred parameter notified of by the terminal, and may configure the transmission parameter for the terminal.

A reference signal for a preparation operation according to the (2-2)th embodiment may include a synchronization signal, a CSI-RS, a CSI-RS for mobility, a CSI-RS for tracking, a DMRS, and like.

The above methods and operations in the (2-2)th embodiment may be also identically applied to a reference signal having another general purpose (e.g., channel estimation, channel measurement, or mobility) as well as a reference signal for a preparation operation.

The above methods and operations in the (2-2)th embodiment may be applied to a case where a configured DRX cycle is smaller than or equal to Y ms. Y may correspond to at least one of {10, 20, 32, 40, 60, 64, 70, 80, 128, 160, 256, 320, 512, 640, 1024, 1280, 2048, 2560, 5120, 10240} ms.

The above methods and operations in the (2-2)th embodiment may be also applied to a case where an operation mode is not a DRX mode, in the same way. If an operation mode is not a DRX mode, a reference signal transmission method may be determined based on a PDCCH monitoring period and occasion. In the method, a DRX cycle may correspond to a PDCCH monitoring period, a DRX occasion may correspond to a PDCCH monitoring occasion, and on the basis of the DRX cycle and occasion, the above detailed methods in the (2-2)th embodiment may be applied in the same way.

The above methods and operations in the (2-2)th embodiment may be restrictively applied to long DRX or short DRX.

(2-3)th Embodiment

A base station may transmit a power saving signal (PoSS) to a terminal in order to reduce the power consumption of the terminal. A power saving signal may representatively include signals below, or signals capable of performing functions below.

A power saving signal (wake-up signal (WUS)) for wake-up

A WUS may correspond to a signal instructing the terminal to monitor a PDCCH. For example, the base station may transmit a WUS to the terminal, and the terminal may monitor a PDCCH after the WUS is detected.

A power saving signal (Go-to-sleep signal (GTS)) for sleep

A GTS may correspond to a signal instructing the terminal not to monitor a PDCCH. For example, the base station may transmit a GTS to the terminal, and the terminal may not monitor a PDCCH during a particular time after the GTS is detected.

A power saving signal (PDCCH adaptation signal (PAS)) for changing a PDCCH monitoring operation A PAS may correspond to a signal dynamically indicating PDCCH monitoring of the terminal. For example, the base station may transmit a PAS to the terminal, and the terminal may detect the PAS and then monitor a PDCCH according to a PDCCH configuration notified of through PAS. A PAS may indicate, for example, a series of parameters relating to PDCCH monitoring (e.g., whether a PDCCH is monitored, a PDCCH monitoring period, the number of times of blind decoding, the index of a search space set to be monitored). The terminal may monitor a PDCCH, based on the indication of the received PAS.

Figure 9:
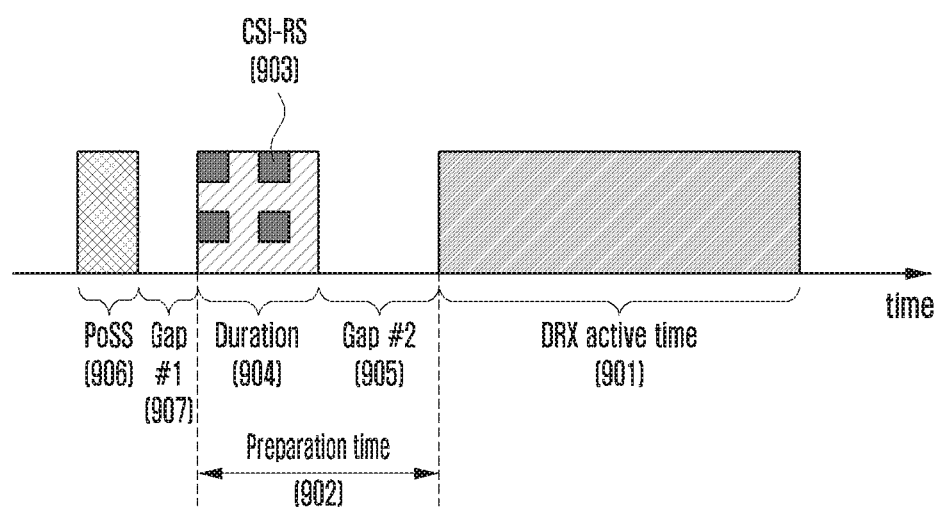
FIG. 9 illustrates operations according to a (2-3)th embodiment of the disclosure.

FIG. 9 illustrates a method for transmitting a reference signal for a preparation operation according to a (2-3)th embodiment of the disclosure.

Referring to FIG. 9, a base station may be notified by a terminal of various parameters relating to transmission of a reference signal 903 for a preparation operation through higher layer signaling (e.g., RRC). The reference signal 903 for a preparation operation may be configured and transmitted before a DRX occasion (or before DRX active time 902) or configured and transmitted in an initial time interval of a DRX active time 902.

The reference signal 903 for a preparation operation may be configured to have a particular periodicity for transmission, and may be transmitted during a particular duration 904 in each transmission occasion. In one transmission occasion duration 904, the reference signal 903 may be mapped to have a particular pattern (mapping of time and frequency) for transmission, and the reference signal 903 having the pattern may be periodically repeatedly transmitted.

In order to reduce the power consumption of the terminal, the base station may configure the terminal such that the terminal monitors a power saving signal (PoSS) 906, through higher layer signaling (e.g., RRC signaling). The terminal configured to monitor the power saving signal 906 by the base station may monitor the power saving signal 906 according to a configuration. The power saving signal 906 may indicate whether the terminal is to monitor a PDCCH is in a DRX occasion active time 901 subsequent to the signal as described above. If the power saving signal 906 instructs the terminal to monitor a PDCCH in the DRX active time 901, the terminal may receive a reference signal 903 for a configured preparation operation and perform the preparation operation. The terminal having completed the preparation operation may monitor a PDCCH in the DRX active time 901. If the power saving signal 906 instructs the terminal not to monitor a PDCCH in the DRX active time 901, the terminal may not receive a reference signal 903 for a configured preparation operation or may not perform a series of preparation operations according to the reference signal.

The above reference signal 903 for a preparation operation according to the (2-3)th embodiment may be configured and transmitted in a time region between a transmission occasion of the power saving signal 906 and the DRX active occasion 901. Therefore, a transmission occasion of the reference signal 903 for the preparation operation may be determined by a combination of configuration parameters relating to the DRX active occasion 901 and the transmission occasion of the power saving signal 906. In addition, a particular time interval (gap #1 907) may exist in a time between the transmission occasion of the power saving signal 906 and transmission occasion of the reference signal 903, and a particular time interval (gap #2 905) may exist in a time between the transmission occasion of the reference signal 903 and the DRX active occasion 901.

For example, an offset and a transmission periodicity of the reference signal 903 may be implicitly determined based on a pre-configured configuration of the power saving signal 906. For example, a transmission periodicity of a reference signal 903 may be identical to that of the power saving signal 906. A time offset of a reference signal 903 may be determined by a time interval, that is gap #1 907, between the transmission occasion of the power saving signal 906 and the transmission of the reference signal 903. The base station may configure, for the terminal, the size of gap #1 907 through higher layer signaling (e.g., RRC or MAC CE) or L1 signaling (e.g., DCI). The terminal may determine a transmission region of a reference signal 903, based on monitoring configuration information on a power saving signal 906, notified of by the base station, and a predefined or pre-configured information on a preparation time 902 or gap #1 907, and may receive the reference signal 903, based on the determination.

The above reference signal for a preparation operation according to the (2-3)th embodiment may include a synchronization signal, a CSI-RS, a CSI-RS for mobility, a CSI-RS for tracking, a DMRS, and like.

The above methods and operations in the (2-3)th embodiment may be also identically applied to a reference signal having another general purpose (e.g., channel estimation, channel measurement, or mobility) as well as a reference signal for a preparation operation.

The above methods and operations in the (2-3)th embodiment may be also applied to a case where an operation mode is not a DRX mode, in the same way. If an operation mode is not a DRX mode, a reference signal transmission method may be determined based on a PDCCH monitoring period and occasion. In the method, a DRX cycle may correspond to a PDCCH monitoring period, a DRX occasion may correspond to a PDCCH monitoring occasion, and on the basis of the DRX cycle and occasion, the above detailed methods in the (2-3)th embodiment may be applied in the same way.

(2-4)th Embodiment

A terminal may be notified by a base station of various parameters relating to transmission of a reference signal 704 for a preparation operation through higher layer signaling (e.g., RRC). For example, the reference signal 704 for a preparation operation may be configured to have a particular periodicity 707 for transmission, and may be transmitted during a particular duration 705 in each transmission occasion. In one transmission occasion duration 705, the reference signal 704 may be mapped to have a particular pattern (mapping of time and frequency) for transmission, and the reference signal 704 having the pattern may be periodically repeatedly transmitted.

If a configured reference signal 704 satisfies at least one of conditions below or a combination of one or more of them, the terminal may determine that the reference signal 704 has been actually transmitted.

Condition 1: The terminal may assume that a corresponding reference signal is always transmitted according to a configuration of the base station.

Condition 2: The base station may transmit, to the terminal, a command triggering transmission of a corresponding reference signal through higher layer signaling (RRC or MAC CE) or L1 signaling (e.g., DCI, PDCCH, or power reducing signal), and the terminal may assume that the reference signal is transmitted after passage of a particular time after the terminal receives the command triggering transmission of the reference signal from the base station.

Condition 3: The terminal may transmit, to the base station, a command triggering transmission of a corresponding reference signal through higher layer signaling (RRC or MAC CE) or L1 signaling (e.g., PUCCH), and may assume that the reference signal is transmitted after passage of a particular time after the terminal transmits the command triggering transmission of the reference signal.

Condition 4: The terminal may assume that a corresponding reference signal is transmitted only in a case where a DRX operation is activated. For example, the terminal may assume that a corresponding reference signal is transmitted only in a case where the terminal operates in a DRX mode.

Condition 5: The terminal may assume that a corresponding reference signal is transmitted only in a case where a DRX cycle is larger than or equal to X ms. X may correspond to at least one of {10, 20, 32, 40, 60, 64, 70, 80, 128, 160, 256, 320, 512, 640, 1024, 1280, 2048, 2560, 5120, 10240}.

Condition 6: The terminal may assume that a corresponding reference signal is transmitted only in a case where a DRX cycle is smaller than or equal to Y ms. Y may correspond to at least one of {10, 20, 32, 40, 60, 64, 70, 80, 128, 160, 256, 320, 512, 640, 1024, 1280, 2048, 2560, 5120, 10240}.

Condition 7: The terminal may assume that a corresponding reference signal is transmitted only in a case where a power saving signal (e.g., WUS) is detected.

(2-5)th Embodiment

With respect to a CSI-RS configured for mobility (i.e., CSI-RS-Resource-Mobility), if DRX is configured for a terminal and a DRX cycle is configured to be larger than or equal to X ms (e.g., X=80), the terminal may not expect that the configured CSI-RS is transmitted in a time interval remaining after a DRX active time is subtracted.

In the above situation, in a case where the terminal is to use the CSI-RS transmitted for mobility, as a reference signal for a preparation operation, if the DRX cycle is configured to be larger than or equal to X ms, a problem in which the CSI-RS is unable is required to be solved.

In the (2-5)th embodiment, if the terminal satisfies at least one of conditions below or a combination of one or more of them, the terminal may be assumed that the CSI-RS has been transmitted regardless of the DRX cycle.

Condition 1: A base station may notify the terminal that a CSI-RS is transmitted even at a DRX cycle larger than or equal to X ms, through higher layer signaling (RRC or MAC CE) or L1 signaling (e.g., DCI), and the terminal may assume that the CSI-RS is transmitted even at the DRX cycle larger than or equal to X ms after passage of a particular time after the terminal receives a command from the base station.

Condition 2: The terminal may request the base station to transmit a corresponding CSI-RS even at a DRX cycle larger than or equal to X ms, through higher layer signaling (RRC or MAC CE) or L1 signaling (e.g., PUCCH), and the terminal may assume that the CSI-RS is transmitted even at the DRX cycle larger than or equal to X ms after passage of a particular time after the terminal transmits a request message.

Condition 3: If the terminal is operated in a power saving mode according to a configuration of the base station or in response to a request of the terminal, the terminal may assume that a CSI-RS is transmitted even at a DRX cycle larger than or equal to X ms.

In a case where the terminal satisfies a condition described above with respect to a CSI-RS configured for mobility, even if a DRX cycle is configured to be larger than or equal to X ms (e.g., X=80), the terminal may assume that the CSI-RS is transmitted even in a DRX inactive time (time interval remaining after an active time is subtracted), and may perform a preparation operation using the CSI-RS.

Third Embodiment

A maximum data rate (peak data rate) supported by a terminal in a 5G communication system may be determined by equation 2 below.

$$\text{data rate(in } Mbps) = 10^{-6} * \sum_{j=1}^{J} \left( v_{Layers}^{(j)} * Q_m^{(j)} * f^{(j)} * R_{max} * \frac{N_{PRB}^{BW(j),\mu} * 12}{T_s^\mu} * (1 - OH^{(j)}) \right) \quad \text{Equation 2}$$

In equation 2, J may indicate the number of carriers grouped through) frequency integration (carrier aggregation), $R_{max}$ may be 948/1024, $v_{Layers}^{(j)}$ may be the maximum number of layers, $Q_m^{(j)}$ may be the maximum modulation order, $f^{(j)}$ may be a scaling index, and $\mu$ may be subcarrier spacing. $f^{(j)}$ may be one of 1, 0.8, 0.75, and 0.4, which is reported by the terminal, and $\mu$ may be given by table 13 below.

TABLE 13

| $\mu$ | $\Delta f = 2^\mu * 15[kHz]$ | Cyclic Prefix |
|---|---|---|
| 0 | 15 | Normal |
| 1 | 30 | Normal |
| 2 | 60 | Normal, Extended |
| 3 | 120 | Normal |
| 4 | 240 | Normal |

$T_s^\mu$ is an average OFDM symbol length, $T_s^\mu$ is calculated by $$\frac{10^{-3}}{14 * 2^\mu},$$

and $N_{PRB}^{BW*(j),\mu}$ is the maximum number of RBs in BW(j). OH(j) is an overhead value, and may be given as 0.14 in downlink FR1 (frequency range 1, a band lower than or equal to 6 GHz), 0.18 in uplink FR1, 0.08 in downlink FR2 (band exceeding 6 GHz), and 0.10 in uplink FR2.

Meanwhile, an actual data rate of the terminal, which may be measured in a real data transmission, may be calculated by dividing the amount of data by data transmission time. The actual data rate may be calculated by dividing one transport block size (TBS) by the length of a TTI in transmission of one transport block (TB), and dividing the sum of TBSs by the length of a TTI in transmission of two transport blocks. Therefore, the maximum actual data rate may be determined by the number of allocated PDSCH symbols.

If a terminal accesses a base station, the terminal may report capability of the terminal to the base station, and the capability of the terminal may include parameters allowing a maximum data rate of the terminal to be calculated, the parameters including a maximum number of layers and a maximum modulation order which the terminal can support. The maximum data rate of the terminal may be calculated as given in equation 2 above, based on the capability of the terminal, reported to the base station, and parameters configured by the base station for the terminal through higher layer signaling (e.g., RRC). The maximum data rate of the terminal may reflect baseband (BB) processing or signal processing capability of the terminal, including channel measurement, channel equalization (equalizer), channel code decoding, and multi-antenna reception. For example, if the maximum data rate of a terminal is high, the terminal may be considered to have high signal processing capability. Meanwhile, the larger the maximum data rate supported by a terminal, the larger the power consumption of the terminal.

In order to reduce the power consumption of the terminal, the terminal may report, to the base station, as a kind of "restricted (or limited) capability", a value relatively smaller than an actual maximum value that the terminal can support in relation to pieces of information below related to capability.

A preferred maximum number of layers: If a maximum number of layers, which the terminal can support, is X, a preferred maximum number of layers for the purpose of reducing the power consumption may be reported as Y ($\leq$X).

A preferred maximum modulation order: If a maximum modulation order which the terminal can support is X, a maximum modulation order preferred for the purpose of reducing the power consumption may be reported as Y ($\leq$X).

A preferred maximum PDSCH symbol length: If a maximum PDSCH symbol length which the terminal can support is X, a maximum PDSCH symbol length preferred for the purpose of reducing the power consumption may be reported as Y ($\leq$X).

A preferred maximum data rate: The terminal may explicitly report a preferred maximum data rate.

The base station may schedule data of the terminal, based on restricted capability information reported by the terminal.

Figure 10:
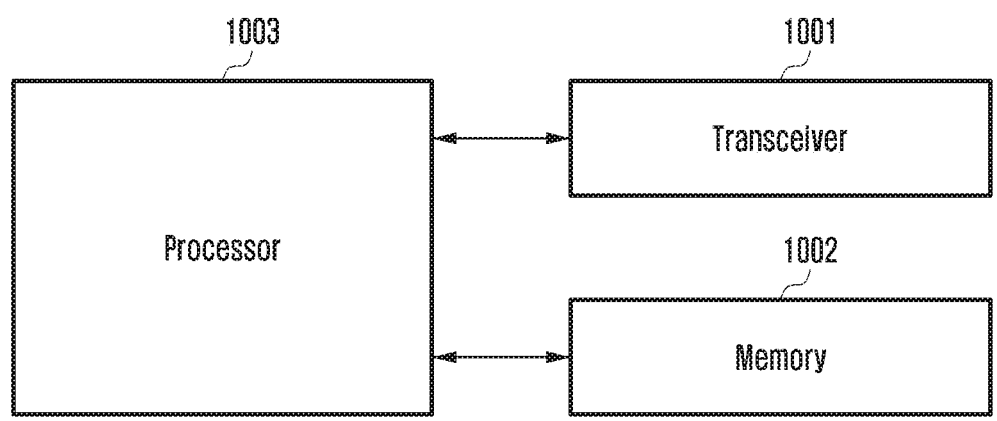
FIG. 10 is a block diagram illustrating an internal structure of a terminal according to an embodiment of the disclosure.
Figure 11:
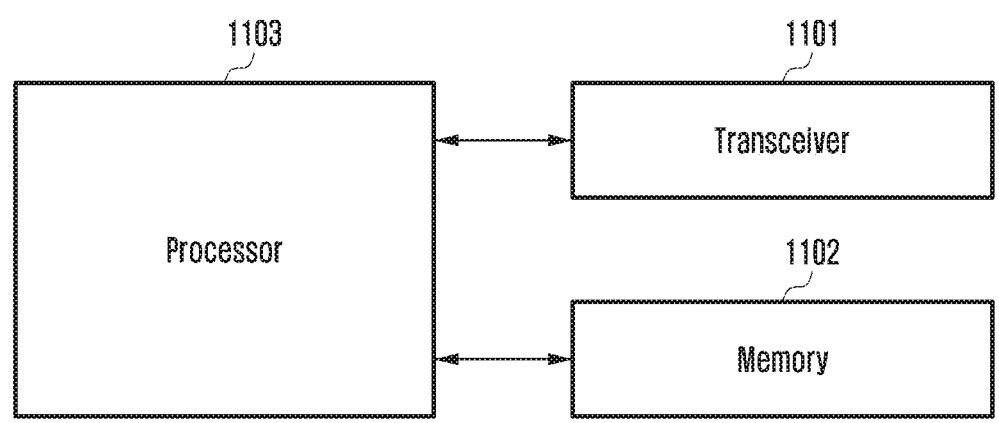
FIG. 11 is a block diagram illustrating an internal structure of a base station according to an embodiment of the disclosure.

FIGS. 10 and 11 illustrate a transceiver, a memory, and a processor of a terminal and a base station to perform the embodiments above, respectively. The disclosure includes a method for transmitting terminal support information, a method for transmitting or receiving a downlink buffer state, and a transmission/reception method between a base station and a terminal configured to apply a data transmission/reception operation according to the methods, the methods corresponding to the above embodiments, and a transceiver, a memory, and a processor of a terminal and a base station should operate to perform the methods according to embodiments, respectively.

FIG. 10 is a block diagram illustrating a structure of a terminal according to an embodiment of the disclosure.

Referring to FIG. 10, a terminal may include a transceiver 1001, a memory 1002, and a processor 1003. The elements of a terminal are not limited to the above example. For example, a terminal may include elements more or less than the above elements. In addition, the transceiver 1001, the memory 1002, and the processor 1003 may be implemented into a single chip.

According to an embodiment, the transceiver 1001 may exchange a signal with a base station. The signal may include control information and data. To this end, the transceiver 1001 may include an RF transmitter that up-converts and amplifies a frequency of a transmitted signal, an RF receiver that low-noise amplifies a received signal and down-converts the frequency, and the like. In addition, the transceiver 1001 may receive a signal through a wireless channel and output the signal to the processor 1003, and may transmit a signal output from the processor 1003, through a wireless channel.

According to an embodiment, the memory 1002 may store a program and data required for an operation of the terminal. In addition, the memory 1002 may store control information or data included in a signal transmitted or received by the terminal. The memory 1002 may be configured by a storage medium, such as read only memory (ROM), random access memory (RAM), hard disk, compact disc-ROM (CD-ROM), and digital versatile disc (DVD), or a combination of storage mediums. In addition, the memory 1002 may be configured by a plurality of memories. According to an embodiment, the memory 1002 may store a program for a sleep mode determining method, a reference signal receiving method, and a PDCCH monitoring method of the terminal, and a data transmission/reception operation according to the methods.

According to an embodiment, the processor 1003 may control a series of processes in which the terminal may operate according to embodiments described above. According to an embodiment, the processor 1003 may differently control a sleep mode determining method, a reference signal receiving method, a PDCCH monitoring method, and a data transmission/reception operation according to the methods according to embodiments. In addition, the processor 1003 may include a plurality of processors and at least one processor may configure a controller. The processor 1003 may execute a program stored in the memory 1002, to differently control a sleep mode determining method, a reference signal receiving method, a PDCCH monitoring method, and a data transmission/reception operation according to the methods according to embodiments.

FIG. 11 is a block diagram illustrating a structure of a base station according to an embodiment of the disclosure.

Referring to FIG. 11, a base station may include a transceiver 1101, a memory 1102, and a processor 1103. The elements of a base station are not limited to the above example. For example, a base station may include elements more or less than the above elements. In addition, the transceiver 1101, the memory 1102, and the processor 1103 may be implemented into a single chip.

According to an embodiment, the transceiver 1101 may exchange a signal with a terminal. The signal may include control information and data. To this end, the transceiver 1101 may include an radio frequency (RF) transmitter that up-converts and amplifies a frequency of a transmitted signal, an RF receiver that low-noise amplifies a received signal and down-converts the frequency, and the like. In addition, the transceiver 1101 may receive a signal through a wireless channel and output the signal to the processor 1103, and may transmit a signal output from the processor 1103, through a wireless channel.

According to an embodiment, the memory 1102 may store a program and data required for an operation of the base station. In addition, the memory 1102 may store control information or data included in a signal transmitted or received by the base station. The memory 1102 may be configured by a storage medium, such as ROM, RAM, hard disk, CD-ROM, and DVD, or a combination of storage mediums. In addition, the memory 1102 may be configured by a plurality of memories. According to an embodiment, the memory 1102 may store a program for a method of configuring a transmission/reception parameter, based on terminal support information, a reference signal transmitting method, and a PDCCH transmitting method of the base station, and a data transmission/reception operation according to the methods.

According to an embodiment, the processor 1103 may control a series of processes so that the base station can operate according to embodiments described above. For example, the processor 1103 may differently control a method of configuring a transmission/reception parameter, based on terminal support information, a reference signal transmitting method, and a PDCCH transmitting method, and a data transmission/reception operation according to the methods according to embodiments. In addition, the processor 1103 may include a plurality of processors and at least one processor may configure a controller. The processor 1103 may execute a program stored in the memory 1102, to differently control a method of configuring a transmission/reception parameter, based on terminal support information, a reference signal transmitting method, and a PDCCH transmitting method, and a data transmission/reception operation according to the methods according to embodiments.

In the above-described detailed embodiments, an element included in the disclosure is expressed in the singular or the plural according to a presented detailed embodiment. However, the singular form or plural form is selected for convenience of description suitable for the presented situation, and the disclosure is not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, radio resource control (RRC) message including first information and second information, wherein the first information includes a channel state information reference signal (CSI-RS) for mobility, a discontinuous reception (DRX), and a length of DRX cycle, and wherein the second information is for indicating that the CSI-RS for mobility is transmitted even if a length of a DRX cycle is larger than or equal to a threshold;
   determining that the CSI-RS for mobility is to be received outside a DRX active time in case that the terminal is configured to operate in a power saving mode and in case that the length of the DRX cycle is larger than or equal to the threshold, based on the second information;
   receiving, from the base station outside a DRX active time, the CSI-RS for mobility based on the first information and the determination that the CSI-RS for mobility is to be received outside the DRX active time;
   performing, by using the received CSI-RS for mobility, a preparation operation for monitoring a physical downlink control channel (PDCCH) in the DRX active time; and
   monitoring the PDCCH in DRX occasions within the DRX active time based on a result of the preparation operation.

2. The method of claim 1,
   wherein the RRC message further includes at least one of information relating to a transmission resource of the CSI-RS for mobility, information relating to a transmission periodicity of the CSI-RS for mobility, information relating to a transmission offset of the CSI-RS for mobility, information relating to a gap between a transmission occasion of the CSI-RS for mobility and an active time, or information relating to a preparation time of the CSI-RS for mobility.

3. The method of claim 1,
   wherein the preparation operation is for controlling a radio frequency (RF) and a baseband to monitor the PDCCH, and includes at least one of channel measurement, channel tracking, or automatic gain control (AGC).

4. A method performed by a base station in a wireless communication system, the method comprising:
   transmitting, to a terminal, radio resource control (RRC) message including first information and second information, wherein the first information includes a channel state information reference signal(CSI-RS) for mobility, a discontinuous reception (DRX), and a length of DRX cycle, and wherein the second information is indicating that that the CSI-RS for mobility is transmitted even if a length of a DRX cycle is larger than or equal to a threshold;
   determining that the CSI-RS for mobility is to be transmitted outside a DRX active time in case that the terminal is configured to operate in a power saving mode and in case that the length of the DRX cycle is larger than or equal to a threshold value, based on the second information;
   transmitting, to the terminal outside a DRX active time, the CSI-RS for mobility based on the first information and the determination that the CSI-RS for mobility is to be received outside the DRX active time, wherein a preparation operation is performed based on the CSI-RS for monitoring a physical downlink control channel (PDCCH) in the DRX active time; and
   transmitting, to the terminal, the PDCCH in DRX occasions within the DRX active time.

5. The method of claim 4,
   wherein the RRC message further includes at least one of information relating to a transmission resource of the CSI-RS for mobility, information relating to a transmission periodicity of the CSI-RS for mobility, information relating to a transmission offset of the CSI-RS for mobility, information relating to a gap between a transmission occasion of the CSI-RS for mobility and an active time, or information relating to a preparation time of the CSI-RS for mobility.

6. The method of claim 4, wherein the preparation operation is for controlling a radio frequency (RF) and a baseband to monitor the PDCCH, and includes at least one of channel measurement, channel tracking, or automatic gain control (AGC).

7. A terminal in a wireless communication system, the terminal comprising:
  a transceiver configured to transmit or receive a signal; and
  a controller coupled with the transceiver and configured to:
  receive, from a base station, radio resource control (RRC) message including first information and second information, wherein the first information includes a channel state information reference signal (CSI-RS) for mobility, a discontinuous reception (DRX), and a length of DRX cycle, and wherein the second information is for indicating that the CSI-RS for mobility is transmitted even if a length of a DRX cycle is larger than or equal to a threshold,
  determine that the CSI-RS for mobility is to be received outside a DRX active time in case that the terminal is configured to operate in a power saving mode and in case that the length of the DRX cycle is larger than or equal to the threshold, based on the second information,
  receive, from the base station outside a DRX active time, the CSI-RS for mobility based on the first information and the determination that the CSI-RS for mobility is to be received outside the DRX active time,
  perform, by using the received CSI-RS for mobility, a preparation operation for monitoring a physical downlink control channel (PDCCH) in the DRX active time, and
  monitor the PDCCH in DRX occasions within the DRX active time based on a result of the preparation operation.

8. The terminal of claim 7,
  wherein the RRC message further includes at least one of information relating to a transmission resource of the CSI-RS for mobility, information relating to a transmission periodicity of the CSI-RS for mobility, information relating to a transmission offset of the CSI-RS for mobility, information relating to a gap between a transmission occasion of the CSI-RS for mobility and an active time, or information relating to a preparation time of the CSI-RS for mobility.

9. The terminal of claim 7,
  wherein the preparation operation is for controlling a radio frequency (RF) and a baseband to monitor the PDCCH, and includes at least one of channel measurement, channel tracking, or automatic gain control (AGC).

10. A base station in a wireless communication system, the base station comprising:
  a transceiver configured to transmit or receive a signal; and
  a controller coupled with the transceiver and configured to:
  transmit, to a terminal, radio resource control (RRC) message including first information and second information, wherein the first information includes a channel state information reference signal (CSI-RS) for mobility, a discontinuous reception (DRX), and a length of DRX cycle, and wherein the second information is indicating that that the CSI-RS for mobility is transmitted even if a length of a DRX cycle is larger than or equal to a threshold,
  determine that the CSI-RS for mobility is to be transmitted outside a DRX active time in case that the terminal is configured to operate in a power saving mode and in case that the length of the DRX cycle is larger than or equal to a threshold value, based on the second information
  transmit, to the terminal outside a DRX active time, the CSI-RS for mobility based on the first information and the determination that the CSI-RS for mobility is to be received outside the DRX active time,
  wherein a preparation operation is performed based on the CSI-RS for monitoring a physical downlink control channel (PDCCH) in the DRX active time, and
  transmit, to the terminal, the PDCCH in DRX occasions within the DRX active time.

11. The base station of claim 10,
  wherein the RRC message further includes at least one of information relating to a transmission resource of the CSI-RS for mobility, information relating to a transmission periodicity of the CSI-RS for mobility, information relating to a transmission offset of the CSI-RS for mobility, information relating to a gap between a transmission occasion of the CSI-RS for mobility and an active time, or information relating to a preparation time of the CSI-RS for mobility.

12. The base station of claim 10, wherein the preparation operation is for controlling a radio frequency (RF) and a baseband to monitor the PDCCH, and includes at least one of channel measurement, channel tracking, or automatic gain control (AGC).

* * * * *